US012621738B2

(12) United States Patent
Wu et al.

(10) Patent No.: US 12,621,738 B2
(45) Date of Patent: May 5, 2026

(54) METHOD OF ADJUSTING NETWORK PARAMETERS DUE TO CONDITIONAL HANDOVER FAILURE CAUSED BY CELL SIGNAL AND LISTEN BEFORE TALK PROBLEMS

(71) Applicant: HUAWEI TECHNOLOGIES CO., LTD., Shenzhen (CN)

(72) Inventors: Yedan Wu, Shanghai (CN); Tingting Geng, Shanghai (CN); Chunhua You, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 18/305,457

(22) Filed: Apr. 24, 2023

(65) Prior Publication Data

US 2023/0262572 A1     Aug. 17, 2023

Related U.S. Application Data

(63) Continuation of application No. PCT/CN2020/122749, filed on Oct. 22, 2020.

(51) Int. Cl.
*H04W 36/36*          (2009.01)
*H04W 36/00*          (2009.01)
(Continued)

(52) U.S. Cl.
CPC ..... *H04W 36/362* (2023.05); *H04W 36/0079* (2018.08); *H04W 36/305* (2018.08); *H04W 74/0816* (2013.01)

(58) Field of Classification Search
None
See application file for complete search history.

(56) References Cited

U.S. PATENT DOCUMENTS

2022/0141735 A1* 5/2022 Liu ..................... H04W 36/305
                                                       370/331
2023/0040285 A1* 2/2023 Parichehrehteroujeni ..................
                                                       H04W 36/0079
(Continued)

FOREIGN PATENT DOCUMENTS

CN          111565426 A      8/2020
WO          2020196124 A1    10/2020

OTHER PUBLICATIONS

Huawei et al:"Discussion for RAN2 SON scope and requirements." 3GPP TSG-RAN WG2 Meeting #111 electronic R2-2007769. Aug. 17-28, 2020. total 9 pages.

(Continued)

*Primary Examiner* — Charles N Appiah
*Assistant Examiner* — Frank E Donado
(74) *Attorney, Agent, or Firm* — HAUPTMAN HAM, LLP

(57)          ABSTRACT

A communication method for a terminal device includes receiving a conditional handover (CHO) command from a source network device. The communication method also includes selecting, by the terminal device, a cell in response to a radio link failure (RLF) in a source cell before the terminal device determines a target cell. The target cell is determined according to the CHO command. The communication method additionally includes sending first information to a network device. The first information includes a first parameter. The first parameter is related to a CHO failure caused by the RLF in the source cell.

20 Claims, 8 Drawing Sheets

(51) Int. Cl.
H04W 36/30 (2009.01)
H04W 74/0816 (2024.01)

(56) References Cited

U.S. PATENT DOCUMENTS

2024/0349133 A1* 10/2024 Fujishiro .............. H04W 36/08
2025/0184842 A1* 6/2025 Chang .................. H04W 36/30

OTHER PUBLICATIONS

OPPO:"Correction on CHO failure handling." 3GPP TSG-RAN WG2 Meeting #110-e R2-2004914. Jun. 1-Jun. 12, 2020. total 2 pages.

Extended European Search Report issued in corresponding European Application No. 20958164.4, dated Oct. 9, 2023, pp. 1-13.

International Search Report issued in corresponding International Application No. PCT/CN2020/122749, dated Jul. 22, 2021, pp. 1-10.

* cited by examiner

METHOD OF ADJUSTING NETWORK PARAMETERS DUE TO CONDITIONAL HANDOVER FAILURE CAUSED BY CELL SIGNAL AND LISTEN BEFORE TALK PROBLEMS

CROSS-REFERENCE TO RELATED APPLICATIONS

This application is a continuation of International Patent Application No. PCT/CN2020/122749, filed on Oct. 22, 2020, the disclosure of which is hereby incorporated by reference in its entirety

TECHNICAL FIELD

This application relates to the field of wireless network technologies, and in particular, to a communication method and a related device.

BACKGROUND

In a conditional handover (CHO) procedure, a network parameter, for example, a handover parameter, is one of key factors that directly affect a handover success rate, and a network device increases the handover success rate by adjusting the network parameter. A channel access (LBT) failure or a radio link failure ( ) may lead to a failure of the CHO procedure. Because the network device cannot learn a cause of the failure of the CHO procedure, the network device cannot adjust the network parameter. This affects system performance.

SUMMARY

Embodiments of this application provide a communication method and a related device, to improve system performance.

According to a first aspect, an embodiment of this application provides a communication method, including: A terminal device receives a conditional handover CHO command from a source base station, where the CHO command includes information about a plurality of candidate cells; the terminal device determines, according to the CHO command, to hand over from a source cell to a target cell; when the terminal device fails to perform channel access LBT in the target cell, or successfully performs LBT and fails to perform random access in the target cell, the terminal device selects a cell; and the terminal device sends first information to a network device. The first information includes a first parameter, and the first parameter is related to a CHO failure caused by the LBT failure in the target cell; or the first information includes a second parameter, and the second parameter is related to a CHO failure caused by the successful LBT and the random access failure in the target cell. The first information is reported to the network device, so that the network device can determine a cause of the CHO failure in the target cell based on the first information, and adjust a corresponding network parameter. Therefore, system performance is improved.

In a possible design, the first parameter includes at least one of the following: indication information indicating that the target cell meets an execution condition of the CHO command and LBT fails to be performed in the target cell, information about a time period from time at which the terminal device receives the CHO command to time at which the target cell is determined, and information about a time period from the time at which the target cell is determined to time at which the terminal device fails to perform LBT in the target cell. The network device determines, by using the first parameter, a cause of handing over from the source cell to the target cell, to adjust the network parameter. Therefore, the system performance is improved.

In another possible design, the second parameter includes at least one of the following: indication information indicating that the target cell meets an execution condition of the CHO command and LBT is successfully performed in the target cell, indication information indicating that the terminal device fails to perform random access in the target cell, information about a time period from time at which the terminal device receives the CHO command to time at which the target cell is determined, information about a time period from the time at which the target cell is determined to time at which the terminal device successfully performs LBT in the target cell, and information about a time period from the time at which the terminal device successfully performs LBT in the target cell to time at which the terminal device fails to perform random access in the target cell. The network device determines, by using the second parameter, a cause of handing over from the source cell to the target cell, to adjust the network parameter. Therefore, the system performance is improved.

In another possible design, after failing to perform CHO in the target cell, the terminal device selects the cell. The cell selected by the terminal device is a first cell, and the first cell is one of the candidate cells. When failing to perform LBT in the first cell, or successfully performing LBT and failing to perform random access in the first cell, the terminal device initiates a radio resource control RRC reestablishment procedure. When the terminal device fails to perform channel access LBT in the first cell, the first information further includes a third parameter, and the third parameter is related to the CHO failure caused by the LBT failure of the terminal device in the first cell; or when the terminal device successfully performs LBT and fails to perform random access in the first cell, the first information further includes a fourth parameter, and the fourth parameter is related to the CHO failure caused by the successful LBT and the random access failure of the terminal device in the first cell. When failing to perform CHO in the candidate cell, the terminal device initiates the RRC reestablishment procedure, and reports the cause of the CHO failure, so that the network device adjusts the network parameter. Therefore, the system performance is improved.

In another possible design, the third parameter includes at least one of the following: indication information indicating that the terminal device fails to perform LBT in the first cell, information about a time period from time at which the terminal device starts to perform LBT in the first cell to time at which the terminal device fails to perform LBT in the first cell, information about a time period from the time at which the terminal device fails to perform LBT in the first cell to time at which the terminal device initiates the RRC reestablishment procedure, and information about a time period from the time at which the terminal device fails to perform LBT in the first cell to time at which the terminal device sends the first information. The network device determines the cause of the CHO failure in the candidate cell by using the third parameter, to adjust the network parameter. Therefore, the system performance is improved.

In another possible design, the fourth parameter includes at least one of the following: indication information indicating that the terminal device successfully performs LBT in the first cell, indication information indicating that the terminal device fails to perform random access in the first cell, information about a time period from time at which the terminal device starts to perform LBT in the first cell to time at which the terminal device successfully performs LBT in the first cell, information about a time period from the time at which the terminal device successfully performs LBT in the first cell to time at which the terminal device fails to perform random access in the first cell, information about a time period from the time at which the terminal device fails to perform random access in the first cell to time at which the terminal device initiates the RRC reestablishment procedure, and information about a time period from the time at which the terminal device fails to perform random access in the first cell to time at which the terminal device sends the first information. The network device determines the cause of the CHO failure in the candidate cell by using the fourth parameter, to adjust the network parameter. Therefore, the system performance is improved.

In another possible design, after failing to perform CHO in the target cell, the terminal device selects the cell. The cell selected by the terminal device is a second cell, and the second cell is one of the candidate cells. When successfully performing LBT and random access in the second cell, the terminal device hands over to the second cell. The first information further includes a fifth parameter, and the fifth parameter is related to a successful CHO caused by the successful LBT and random access of the terminal device in the second cell. When the CHO succeeds in the candidate cell, a cause of the successful CHO is reported, so that the network device adjusts the network parameter. Therefore, the system performance is improved.

In another possible design, the fifth parameter includes at least one of the following: indication information indicating that the terminal device successfully performs LBT in the second cell, indication information indicating that the terminal device successfully performs random access in the second cell, information about a time period from time at which the terminal device starts to perform LBT in the second cell to time at which the terminal device successfully performs LBT in the second cell, information about a time period from the time at which the terminal device successfully performs LBT in the second cell to time at which the terminal device successfully performs random access in the second cell, and information about a time period from the time at which the terminal device successfully performs random access in the second cell to time at which the terminal device sends the first information. The network device determines the cause of the successful CHO in the candidate cell by using the fifth parameter, to adjust the network parameter. Therefore, the system performance is improved.

In another possible design, after failing to perform CHO in the target cell, the terminal device selects the cell. If the cell selected by the terminal device is a third cell, and the third cell is a cell other than the candidate cell, the terminal device initiates an RRC reestablishment procedure in the third cell. In this design, the first information further includes a sixth parameter, and the sixth parameter is related to the CHO failure of the terminal device in the target cell and RRC reestablishment performed in the third cell.

In another possible design, the sixth parameter includes at least one of the following: indication information indicating that the terminal device successfully initiates the RRC reestablishment procedure in the third cell, information about a time period from time at which the terminal device starts to initiate the RRC reestablishment procedure in the third cell to time at which the terminal device successfully initiates the RRC reestablishment procedure in the third cell, and information about a time period from the time at which the terminal device successfully initiates the RRC reestablishment procedure in the third cell to time at which the terminal device sends the first information.

In another possible design, if the source base station fails to perform LBT in the source cell for a plurality of times until, finally, LBT is successfully performed, after receiving the first information, the source base station may adjust an LBT parameter based on the first information and a related status of performing LBT in the source cell recorded by the source base station.

In another possible design, the network device is the source base station, a base station to which the target cell belongs, or a base station to which the candidate cell belongs.

According to a second aspect, an embodiment of this application provides a communication method, including: A first network device receives first information, where the first information includes a first parameter, and the first parameter is related to a CHO failure caused by an LBT failure in a target cell; or the first information includes a second parameter, and the second parameter is related to a CHO failure caused by successful LBT and a random access failure in a target cell; and the first network device adjusts a network parameter based on the first information, where the network parameter includes at least one of a parameter used by a terminal device to perform conditional handover between cells and a parameter used for channel access LBT. The network device determines a cause of the CHO failure in the target cell by receiving the first information, and adjusts the corresponding network parameter. Therefore, system performance is improved.

In a possible design, the first network device receives the first information from a second network device. The first information is received by the second network device from the terminal device.

In another possible design, the first network device generates second information based on the first information; and the first network device sends the second information to a third network device. The second information indicates the third network device to adjust the network parameter.

In another possible design, the first network device is a source base station, or the first network device is a base station other than the source base station, or the first network device is a core network device.

According to a third aspect, an embodiment of this application provides a communication method, including: A terminal device receives a conditional handover CHO command from a source base station, where the CHO command includes information about a plurality of candidate cells; when a radio link failure RLF occurs in a source cell before the terminal device determines a target cell according to the CHO command, the terminal device selects a cell; and the terminal device sends first information to a network device, where the first information includes a first parameter, and the first parameter is related to a CHO failure caused by the RLF that occurs in the source cell. The first information is reported to the network device, so that the network device can determine a cause of the CHO failure based on the first information, and adjust a corresponding network parameter. Therefore, system performance is improved.

In another possible design, the first parameter includes at least one of the following: indication information indicating that the RLF occurs in the source cell, and a time period from time at which the terminal device receives the CHO command to time at which the RLF occurs in the source cell.

The network device determines, by using the first parameter, a cause of the RLF that occurs in the source cell, to adjust the network parameter. Therefore, the system performance is improved.

In another possible design, when the terminal device selects the cell, the selected cell is a first cell, and the first cell is one of the candidate cells. When failing to perform LBT in the first cell, or successfully performing LBT and failing to perform random access in the first cell, the terminal device initiates an RRC reestablishment procedure. When the terminal device fails to perform LBT in the first cell, the first information further includes a second parameter, and the second parameter is related to the CHO failure caused by the LBT failure of the terminal device in the first cell; or when the terminal device successfully performs LBT and fails to perform random access in the first cell, the first information further includes a third parameter, and the third parameter is related to the CHO failure caused by the successful LBT and the random access failure of the terminal device in the first cell. When failing to perform CHO in the candidate cell, the terminal device initiates the RRC reestablishment procedure, and reports the cause of the CHO failure, so that the network device adjusts the network parameter. Therefore, the system performance is improved.

In another possible design, the second parameter includes at least one of the following: indication information indicating that the terminal device fails to perform LBT in the first cell, information about a time period from time at which the terminal device starts to perform LBT in the first cell to time at which the terminal device fails to perform LBT in the first cell, information about a time period from the time at which the terminal device fails to perform LBT in the first cell to time at which the terminal device initiates the RRC reestablishment procedure, and information about a time period from the time at which the terminal device fails to perform LBT in the first cell to time at which the terminal device sends the first information. The network device determines the cause of the CHO failure in the candidate cell by using the second parameter, to adjust the network parameter. Therefore, the system performance is improved.

In another possible design, the third parameter includes at least one of the following: indication information indicating that the terminal device successfully performs LBT in the first cell, indication information indicating that the terminal device fails to perform random access in the first cell, information about a time period from time at which the terminal device starts to perform LBT in the first cell to time at which the terminal device successfully performs LBT in the first cell, information about a time period from the time at which the terminal device successfully performs LBT in the first cell to time at which the terminal device fails to perform random access in the first cell, information about a time period from the time at which the terminal device fails to perform random access in the first cell to time at which the terminal device initiates the RRC reestablishment procedure, and information about a time period from the time at which the terminal device fails to perform random access in the first cell to time at which the terminal device sends the first information. The network device determines the cause of the CHO failure in the candidate cell by using the third parameter, to adjust the network parameter. Therefore, the system performance is improved.

In another possible design, when the terminal device selects the cell, the cell selected by the terminal device is a second cell, and the second cell is one of the candidate cells. When LBT and random access are successfully performed in the second cell, the terminal device hands over to the second cell. The first information further includes a fourth parameter, and the fourth parameter is related to a successful CHO caused by the successful LBT and random access of the terminal device in the second cell. When the candidate cell is successfully connected, the terminal device reports a cause of the successful CHO, so that the network device adjusts the network parameter. Therefore, the system performance is improved.

In another possible design, the fourth parameter includes at least one of the following: indication information indicating that the terminal device successfully performs LBT in the second cell, indication information indicating that the terminal device successfully performs random access in the second cell, information about a time period from time at which the terminal device starts to perform LBT in the second cell to time at which the terminal device successfully performs LBT in the second cell, information about a time period from the time at which the terminal device successfully performs LBT in the second cell to time at which the terminal device successfully performs random access in the second cell, and information about a time period from the time at which the terminal device successfully performs random access in the second cell to time at which the terminal device sends the first information. The network device determines the cause of the successful CHO in the candidate cell by using the fourth parameter, to adjust the network parameter. Therefore, the system performance is improved.

In another possible design, when the terminal device selects the cell, and the cell selected by the terminal device is a third cell, the terminal device initiates an RRC reestablishment procedure in the third cell. The third cell is a cell other than the candidate cell. The RRC reestablishment procedure is initiated in the cell other than the candidate cell to ensure network connection. In this design, the first information further includes a fifth parameter, and the fifth parameter is related to the RLF that is of the terminal device and that occurs in the source cell and RRC reestablishment performed in the third cell.

In another possible design, the fifth parameter includes at least one of the following: indication information indicating that the terminal device successfully initiates the RRC reestablishment procedure in the third cell, information about a time period from time at which the terminal device starts to initiate the RRC reestablishment procedure in the third cell to time at which the terminal device successfully initiates the RRC reestablishment procedure in the third cell, and information about a time period from the time at which the terminal device successfully initiates the RRC reestablishment procedure in the third cell to time at which the terminal device sends the first information.

In another possible design, the network device is the source base station, a base station to which the target cell belongs, or a base station to which the candidate cell belongs.

According to a fourth aspect, an embodiment of this application provides a communication method, including: A first network device receives first information, where the first information includes a first parameter, and the first parameter is related to a CHO failure caused by the RLF that occurs in a source cell; and the first network device adjusts a network parameter based on the first information, where the network parameter includes at least one of a parameter used by the terminal device to perform conditional handover between cells and a parameter used for channel access LBT. The network device determines a cause of the CHO failure by receiving the first information, and adjusts the corresponding network parameter. Therefore, system performance is improved.

In a possible design, the first network device receives the first information from a second network device. The first information is received by the second network device from the terminal device.

In another possible design, the first network device generates second information based on the first information; and the first network device sends the second information to a third network device. The second information indicates the third network device to adjust the network parameter.

In another possible design, the first network device is a source base station, or the first network device is a base station other than the source base station, or the first network device is a core network device.

According to a fifth aspect, an embodiment of this application provides a communication method, including: When a CHO command fails to be sent because a source base station fails to perform channel access LBT in a source cell, a terminal device initiates a radio resource control RRC reestablishment procedure after a radio link failure RLF occurs in the source cell, and sends first information to a base station of an RRC reestablishment cell. The first information is related to a CHO failure caused by the LBT failure of the source base station in the source cell. The terminal device determines, by sending the first information to a network device, a cause of the source base station failing to send the CHO command, and adjusts a corresponding network parameter. Therefore, system performance is improved.

According to a sixth aspect, an embodiment of this application provides a communication method, including: A network device receives first information, where the first information is related to a CHO failure caused by an LBT failure of a source base station in a source cell; and adjusts a network parameter based on the first information, where the network parameter includes a parameter used for channel access LBT. The network device determines, by receiving the first information, a cause of the source base station failing to send a CHO command, and adjusts the corresponding network parameter. Therefore, system performance is improved.

According to a seventh aspect, an embodiment of this application provides a communication apparatus. The communication apparatus is configured to implement the methods and the functions that are performed by the terminal device in the first aspect, the third aspect, and the fifth aspect. The communication apparatus is implemented by hardware/software. The hardware/software of the communication apparatus includes modules corresponding to the foregoing functions.

According to an eighth aspect, an embodiment of this application provides a communication apparatus. The communication apparatus is configured to implement the methods and the functions that are performed by the network device in the second aspect, the fourth aspect, and the sixth aspect. The communication apparatus is implemented by hardware/software. The hardware/software of the communication apparatus includes modules corresponding to the foregoing functions.

According to a ninth aspect, an embodiment of this application provides a communication apparatus. The communication apparatus is used in a terminal device, and the communication apparatus may be the terminal device or a chip in the terminal device. The communication apparatus includes a processor, a memory, and a communication bus.

The communication bus is configured to implement connections and communication between the processor and the memory. The processor executes a program stored in the memory to implement the steps in the first aspect, the third aspect, and the fifth aspect.

According to a tenth aspect, an embodiment of this application provides a communication apparatus. The communication apparatus is used in a network device. The communication apparatus may be the network device or a chip in the network device. The communication apparatus includes a processor, a memory, and a communication bus. The communication bus is configured to implement connections and communication between the processor and the memory. The processor executes a program stored in the memory to implement the steps in the second aspect, the fourth aspect, and the sixth aspect.

According to an eleventh aspect, this application provides a computer-readable storage medium. The computer-readable storage medium stores instructions. When the instructions are run on a computer, the computer is enabled to perform the method in the foregoing aspects.

According to a twelfth aspect, this application provides a computer program product including instructions. When the instructions are run on a computer, the computer is enabled to perform the method in the foregoing aspects.

According to a thirteenth aspect, an embodiment of this application provides a chip, including a processor. The chip is configured to invoke and run instructions stored in a memory, so that a communication device in which the chip is installed performs the method in any one of the foregoing aspects.

According to a fourteenth aspect, an embodiment of this application provides another chip, including an input interface, an output interface, and a processor. Optionally, the chip further includes a memory. The input interface, the output interface, the processor, and the memory are connected to each other through an internal connection path. The processor is configured to execute code in the memory. When the code is executed, the processor is configured to perform the method in any one of the foregoing aspects.

According to a fifteenth aspect, an embodiment of this application provides a communication system. The communication system includes at least one terminal device and at least one network device. The terminal device is configured to perform the steps in the first aspect, the third aspect, and the fifth aspect. The network device is configured to perform the steps in the second aspect, the fourth aspect, and the sixth aspect.

BRIEF DESCRIPTION OF DRAWINGS

To describe the technical solutions in embodiments of this application or in the background more clearly, the following describes the accompanying drawings for describing embodiments of this application or the background.

DESCRIPTION OF EMBODIMENTS

The following describes embodiments of this application with reference to the accompanying drawings in embodiments of this application.

Figure 1:
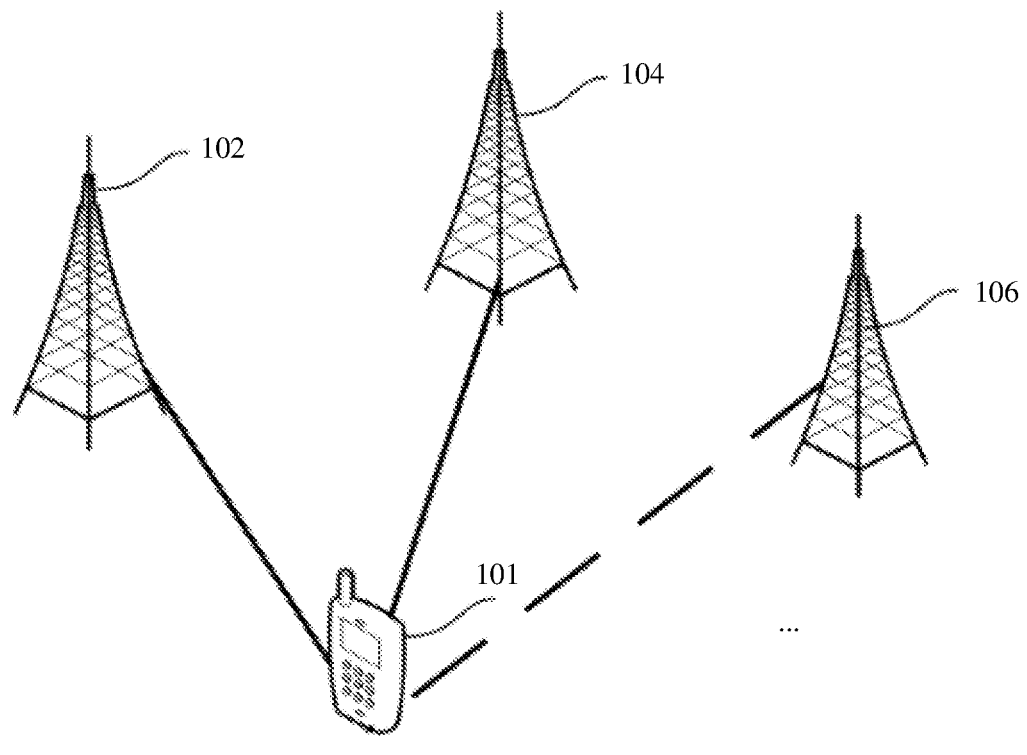
FIG. 1 is a schematic diagram of a communication system according to an embodiment of this application.

FIG. 1 is a schematic diagram of an architecture of a communication system according to an embodiment of this application. The communication system may include a plurality of network devices (for example, a network device 102, a network device 104, and a network device 106) and a terminal device 101.

The terminal device in this application may include a device that provides voice and/or data connectivity for a user. The terminal device includes a device that provides the voice for the user, or includes a device that provides the data connectivity for the user, or includes a device that provides the voice and the data connectivity for the user. For example, the terminal device may include a handheld device having a wireless connection function, or a processing device connected to a wireless modem. The terminal device may communicate with a core network via a radio access network (RAN), and exchange voice or data with the RAN, or interact voice and data with the RAN. The terminal device may include user equipment (UE), a mobile station (MS), a mobile terminal (MT), and the like, and refers to the device that provides the voice and/or the data connectivity for the user. For example, the terminal device is a handheld device or a vehicle-mounted device that has a wireless connection function. Currently, for example, the terminal is a mobile phone, tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

In embodiments of this application, the UE is used as the terminal device to describe the technical solutions of this application. Details are not described below again.

The network device in this application may include a core network device and an access network device.

The core network device is a device in a core network (CN) that provides service support for the terminal device. The core network device may include an access and mobility management function (AMF) entity, a session management function (SMF) entity, a user plane function (UPF) entity, and the like. The AMF entity may be responsible for access management and mobility management of the terminal device. The SMF entity may be responsible for session management, for example, user session establishment. The UPF entity may be a user-plane functional entity, and is mainly responsible for a connection to an external network. It should be noted that the entity in this application may also be referred to as a network element or a functional entity. For example, the AMF entity may also be referred to as an AMF network element or an AMF functional entity. For another example, the SMF entity may also be referred to as an SMF network element, an SMF functional entity, or the like.

Figure 2:
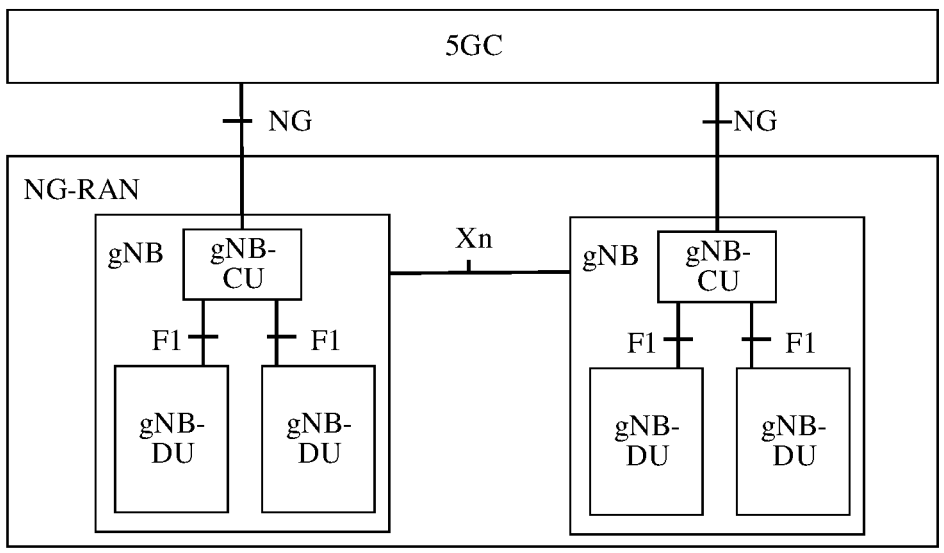
FIG. 2 is a schematic diagram of a structure of a network device, in accordance with one or more embodiments.

As shown in FIG. 2, the access network device may be a base station (for example, a gNB), and may include central unit (CU) nodes and distributed unit (DU) nodes. The CU implements a part of functions of the gNB, and the DU implements a part of functions of the gNB. For example, the CU may implement functions of a radio resource control (RRC) layer, a service data adaptation protocol ( ) layer, and a packet data convergence protocol (PDCP) layer. In addition, the DU may implement functions of a radio link control (RLC) layer, a media access control (MAC) layer, and a physical (PHY) layer.

Figure 3:
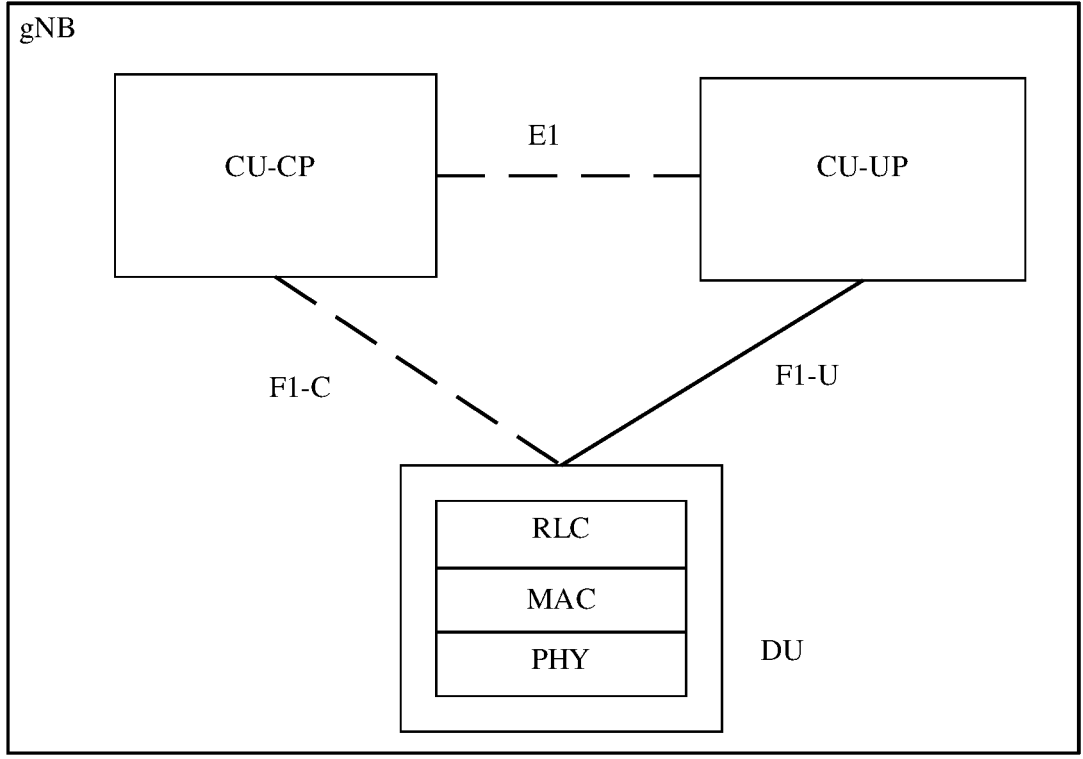
FIG. 3 is a schematic diagram of a structure of another network device, in accordance with one or more embodiments.

FIG. 3 is a schematic diagram of a structure of a network device. A CU node may be divided into a control plane (CU-CP) and a user plane (CU-UP). The CU-CP is responsible for a control plane function. The CU-UP is responsible for a user plane function. The CU-CP and the CU-UP may communicate with each other through an E1 interface. The CU-CP and the DU may communicate with each other through an F1-C interface. The CU-CP and the DU may communicate with each other through an F1-C interface.

The technical solutions in embodiments of this application may be applied to various communication systems, for example, a long term evolution (LTE) system, a fifth generation (5G) system, for example, a new radio (NR) system, and another new communication system, for example, a 6G system.

The following describes technologies related to this application.

LBT:

For an operator without enough licensed spectra, licensed assisted access (LAA) can be used to obtain better coverage and capacity. A cell in an unlicensed frequency band is configured as a CA secondary carrier in the LAA, to use an unlicensed spectrum to offload data in a licensed spectrum. On the unlicensed spectrum, because a radio resource can be freely used, avoiding mutual interference between adjacent communication devices becomes a key problem. The interference problem should be completely managed and controlled in both frequency domain and time domain. Otherwise, normal communication on the unlicensed spectrum cannot be ensured.

An LBT technology is introduced to solve the interference problem. LBT means that channel monitoring is first performed on an LAA cell (e.g., a cell using the unlicensed spectrum) before data is sent, to check whether a current channel is in an idle state. If the current channel is in the idle state, data transmission is performed. If the current channel is in a busy state, data transmission should be delayed for a period of time until the channel is idle for data transmission. Duration for each transmission cannot not exceed preset time. Data transmission should be released when the preset time is reached. Whether data transmission can be performed is monitored again by using an LBT procedure. In other words, before signaling/data is sent, LBT should be performed for all cells that use the unlicensed spectrum, and both a base station side and a UE side perform LBT. In an LBT execution process, an LBT failure may occur. In other words, no appropriate channel is found for transmission.

Figures 4, 5:
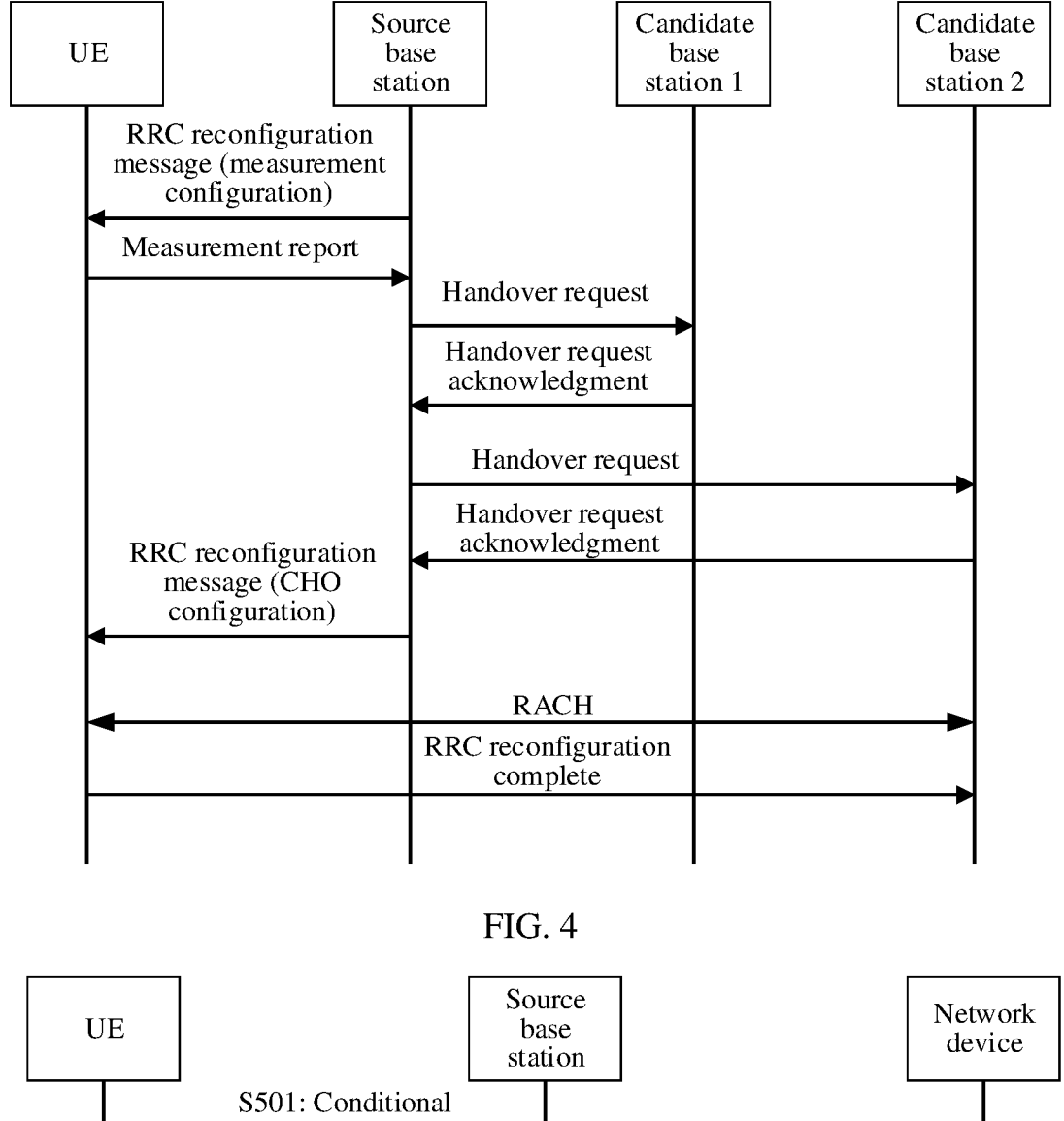
FIG. 4 is a schematic diagram of a CHO procedure, in accordance with one or more embodiments.
FIG. 5 is a schematic flowchart of a communication method according to an embodiment of this application.

Basic Procedure for a CHO Using a Licensed Spectrum:

FIG. 4 is a schematic diagram of a CHO procedure. A network device may configure one or more candidate cells for UE. In some embodiments, if the network device configures a plurality of candidate cells for the UE, the network device may send CHO configuration information corresponding to the plurality of candidate cells to the UE by using one RRC message or a plurality of RRC messages. The RRC message may be a newly defined message (for example, CondRRCReconfiguration) or a reused existing RRC message (for example, a reused RRC reconfiguration message). Details are as follows.

When signal quality of a source link is good, a source base station sends an RRC message to the UE. The RRC message may include CHO configuration information corresponding to at least one candidate cell. The CHO configuration information corresponding to one candidate cell may include CHO execution condition information and related information about the candidate cell.

The related information about the candidate cell may include at least one of the following: a cell radio network temporary identifier (C-RNTI) allocated by the candidate cell to the terminal device, resource information of a random access channel (RACH) required for accessing the candidate cell, index information corresponding to the candidate cell (for example, a measurement identifier measID corresponding to the cell and/or CHO-ConfigId corresponding to the cell), a cell global identifier (CGI) of the candidate cell, a physical cell identifier (PCI) of the candidate cell, frequency information corresponding to the candidate cell, and a physical layer configuration parameter, a MAC layer configuration parameter, an RLC layer configuration parameter, a PDCP layer configuration parameter, an SDAP layer configuration parameter, an RRC layer configuration parameter, and the like corresponding to the candidate cell. The frequency information corresponding to the candidate cell includes one or more of the following: an absolute frequency of a synchronization signal block SSB (absolute frequency SSB), an absolute frequency location (absolute Frequency point A) of a reference resource module (common RBO), a frequency band list, and an SCS-specific carrier list.

The CHO execution condition information may include a CHO execution event type and a corresponding threshold. The CHO execution event type may include an event A3, an event A4, an event A5, an event B1, an event B2, another execution event type, or the like. One candidate cell can be configured with one or more CHO execution conditions. For example, one candidate cell may be configured with one execution event type, but one candidate cell may be configured with at least two different thresholds and/or at most two types of different trigger quality. The trigger quality may include reference signal received power (RSRP), reference signal received quality (RSRQ), and a signal to interference plus noise ratio (SINR). Alternatively, one candidate cell may be configured with at least two different execution event types and thresholds corresponding to the execution event types. CHO execution event types corresponding to different candidate cells may be the same or different. Thresholds corresponding to different candidate cells may be the same or different. This is not limited.

After receiving the RRC message, the UE determines, based on the RRC message, whether the candidate cells meet a CHO execution condition, and uses a candidate cell that meets the execution condition as a target cell. For example, a CHO execution event type configured for a candidate cell A is an A3 event, and a configured corresponding threshold is a first threshold. When cell signal quality of the candidate cell A is higher than cell signal quality of a serving cell by the first threshold, it may be considered that the candidate cell A meets the CHO execution condition, and the candidate cell A may be determined as the target cell. For example, the A3 event is configured for the candidate cell A and two types of trigger quality, for example, RSRP and RSRQ are configured. A configured first threshold corresponding to the RSRP is E, and a configured first threshold corresponding to the RSRQ is F. In this case, when the RSRP of the candidate cell A is greater than RSRP of the serving cell by E, and the RSRQ of the candidate cell A is greater than RSRQ of the serving cell by F, it may be considered that the candidate cell A meets the CHO execution condition, and the candidate cell A may be determined as the target cell. For another example, if a CHO execution event type configured for a candidate cell B is an A5 event, one type of trigger quality is configured, for example, RSRP, and configured corresponding thresholds are a second threshold and a third threshold, when the RSRP of the candidate cell B is greater than the second threshold, and RSRP of a serving cell is less than the third threshold, it may be considered that the candidate cell B meets the CHO execution condition, and the candidate cell B may be determined as the target cell.

Basic Procedure for a CHO Using an Unlicensed Spectrum:

For the basic procedure for the CHO using an unlicensed spectrum, refer to the basic procedure for the CHO using a licensed spectrum in FIG. 4. A difference is that because a source cell/a candidate cell uses an unlicensed spectrum, before sending a message or data, UE or a network device first performs LBT, and the message or the data can be generated only after LBT is successfully performed.

Processing Mechanism for a CHO Failure:

(1) After determining a target cell, UE performs a random access process with the determined target cell. Optionally, the random access process may be skipped and not performed. In some embodiments, after determining the target cell, the UE may directly send an RRC reconfiguration complete message to a target base station. If the UE fails to access or hand over to the target cell, an action A is performed.

(2) Before UE determines a target cell based on CHO configuration information, or after UE determines a target cell, if an RLF occurs in a source cell before the UE successfully hands over to the target cell, an action A is performed.

(3) In a CHO mechanism, a source base station may maintain RRC connection/data transmission with UE until the UE determines a target cell or until the UE successfully hands over to a target cell that meets a CHO execution condition. For example, the UE sends an RRC reconfiguration complete message to the target cell that is successfully accessed. In other words, after first sending an RRC message including CHO configuration information to the UE, a network device may further send another RRC message to the UE subsequently. For example, a conventional handover message may be sent to the UE. Correspondingly, if the UE receives the conventional handover message before determining the target cell based on the CHO configuration information, the UE stops a CHO procedure. For example, the UE stops a procedure of attempting to determine the target cell from candidate cells. Instead, a conventional handover procedure is performed based on the conventional handover message. Alternatively, after determining the target cell, if the UE receives the conventional handover message before successfully handing over to the target cell, the UE stops a CHO procedure. For example, the UE stops a random access procedure with the determined target cell. Instead, the UE performs a conventional handover procedure based on the conventional handover message. If the conventional handover procedure fails, an action A is performed.

Action A: The UE selects a cell. (1) If the selected cell is one of the candidate cells, the UE attempts to hand over to the cell. Further, if access/handover of the UE to the cell succeeds, it is considered that the CHO procedure succeeds. If access/handover of the UE to the cell fails, the UE performs an RRC reestablishment procedure. (2) If the selected cell does not belong to the candidate cells, the UE initiates an RRC reestablishment procedure.

Mobility Robustness Optimization (MRO) Mechanism:

In an existing MRO mechanism, a terminal device sends related information in a handover failure process to a network device, and then the network device optimizes a handover parameter based on the related information reported by the terminal device. That the terminal device reports the related parameter in the handover failure process includes the following two scenarios. First, the terminal device fails to receive a conventional handover message, and an RLF occurs. Second, a conventional handover message is successfully received, but the terminal device fails to access to a target cell or an RLF occurs quickly after the terminal device accesses a target cell.

A conventional handover procedure is used as an example, scenarios in which the terminal device records the related information in the handover failure process includes:

A connection failure occurs after the UE is connected to a current serving cell for a period of time, or the UE fails to receive the conventional handover message, in other words, the RLF occurs on the UE in a source cell (in other words, a connection failure type is the RLF). Then, the UE attempts to reestablish a connection.

After the UE successfully hands over from the source cell to the target cell, a connection failure occurs (in other words, a connection failure type is the RLF), and the UE attempts to reestablish a connection in the source cell or another cell different from the target cell.

If a handover failure occurs in a process in which the UE hands over from the source cell to the target cell (in other words, a connection failure type is an HOF), the UE attempts to reestablish a connection in the source cell or another cell different from the target cell.

In the foregoing three scenarios, the UE records the related information in the handover failure process and reports the related information in the handover failure process by using an RLF report. The related information in the handover failure process includes one or more of the following:

(1) failedPcellID: cell information of the RLF detected by the UE, or cell information of the target cell to which the UE fails to be handed over.

(2) connectionFailureType: connection failure type, for example, the RLF or the HOF.

(3) previousPCellId: cell information of the source cell used when the UE receives a handover command the latest time.

(4) reestablishmentCellId: information about a cell in which reestablishment is initiated after the connection failure.

(5) C-RNTI: identification information of the UE in a cell in which a failure occurs. For example, when the failure is the RLF, the identification information is a C-RNTI allocated to the UE by a serving cell when the RLF occurs; when failure is the HOF, the identification information is a C-RNTI allocated to the UE by the source cell and/or a C-RNTI allocated to the UE by the target cell.

(6) Connection failure time (timeConnFailure): a time period from time at which an HO command is received the last time to time at which the connection fails.

(7) Time from the connection failure to the reconnection: for example, a time period from time at which the handover failure or the RLF occurs to time at which the connection of the UE is restored (or reconnected).

(8) Time since failure (timeSinceFailure): a time length that starts to be recorded since the connection fails. The time since failure usually refers to a time period from time at which the connection fails to time at which a failure report is reported.

(9) Signal quality of each cell. The signal quality may include cell signal quality and/or signal quality of at least one beam belonging to the cell. The signal quality includes RSRP, RSRQ, and/or an SINR. The signal quality may be a measurement result obtained based on radio resource management (RRM) measurement of a synchronization signal block (SSB) and/or a channel state information reference signal (CSI-RS).

The cell information may include a cell global identifier (CGI), a physical cell identifier (PCI), and frequency information. Optionally, the cell information may further include at least one of a tracking area code (TAC) and a RAN area code (RANAC). The CGI includes a PLMN ID and a cell ID.

UE reporting mechanism: UE may send indication information to a first network device. The indication information indicates the UE to record and store related information about a connection failure. Then the first network device sends a request message (for example, a user information request message) to the UE. After receiving the request message sent by the first network device, the UE sends the corresponding information recorded by the UE to the first network device. For example, the UE sends a user information response (UEInformationResponse) message to the first network device. The UE information response message may include the corresponding information recorded by the UE. The first network device may be a network device to which a source cell belongs, a network device to which a target cell belongs, a network device to which an RRC reestablishment cell belongs, or another network device. This is not limited herein. After receiving the corresponding information reported by the UE, the first network device may send, to a source network device, a part or all of the information reported by the UE. Optionally, the source network device adjusts a corresponding parameter based on the part or all of the received information. Optionally, the source network device may further send a part or all of the part or all of the received information to a target network device or a reestablishment network device. Correspondingly, the target network device or the reestablishment network device adjusts the corresponding parameter. Alternatively, after receiving the corresponding information reported by the UE, the first network device may send a part or all of the information reported by the UE to a target network device. Optionally, the target network device may further send a part or all of the part or all of the received information to a source network device, and the source network device may adjust a corresponding parameter.

However, an LBT failure may also lead to the failure of the CHO procedure, but the UE may not record a parameter related to the CHO failure caused by the LBT failure, and the network device cannot identify whether a cause of the failure is a mobility parameter configuration problem or an LBT problem. Consequently, the system performance is affected. To resolve the foregoing technical problems, embodiments of this application provide the following solutions.

As shown in FIG. 5, an embodiment of this application provides a communication method. This embodiment of this application includes at least the following steps.

S501: UE receives a CHO command from a source base station, and the UE determines, according to the CHO command, to hand over from a source cell to a target cell.

Optionally, before sending the CHO command to the UE, the source base station may first perform LBT in the source cell. If LBT is successfully performed, the source base station sends the CHO command to the UE. If LBT fails to be performed, LBT may be performed again in the source cell until LBT is successfully performed. In this case, the source base station may record a related case of performing LBT in the source cell before sending the CHO command.

S502: When failing to perform channel access LBT in the target cell, or successfully performing LBT and failing to perform random access (for example, failing to establish an RACH) in the target cell, the UE selects a cell.

S503: The UE sends first information to a network device. The first information includes a first parameter, and the first parameter is related to a CHO failure caused by the LBT failure in the target cell; or the first information includes a second parameter, and the second parameter is related to a CHO failure caused by the successful LBT and the random access failure in the target cell.

Optionally, the network device is the source base station, a base station to which the target cell belongs, or a base station to which a candidate cell belongs, or may be another base station.

Optionally, the network device may include a first network device and a second network device. For example, the first network device may be the source base station, and the second network device may be a base station other than the source base station. Alternatively, the first network device may be a target base station, and the second network device may be a core network device.

Optionally, the first network device may receive the first information from the second network device. The first information is received by the second network device from the UE.

Optionally, the first network device may generate second information based on the first information, and send the second information to a third network device. The second information indicates the third network device to adjust a network parameter.

The candidate cell may represent that when the UE cannot access the target cell, the candidate cell may be used as a backup cell for the UE to access. That the UE fails to hand over from the source cell to the target cell includes the following two cases.

In the first case, the UE fails to perform channel access LBT in the target cell. The first information includes the first parameter, and the first parameter may include at least one of the following: indication information indicating that the target cell meets an execution condition of the CHO command and LBT fails to be performed in the target cell, information about a time period from time at which the UE receives the CHO command to time at which the target cell is determined, and information about a time period from the time at which the target cell is determined to time at which the UE fails to perform LBT in the target cell.

Optionally, the first parameter may further include cell information of the source cell, cell information of the target cell, a cell radio network temporary identifier C-RNTI allocated by the target cell to the UE, a failure type value (for example, an HOF) of the UE in the target cell, signal quality of the source cell and signal quality of the target cell used when the UE fails to perform LBT in the target cell, and the like.

In the second case, the UE successfully performs LBT and fails to perform random access in the target cell. The first information includes the second parameter, and the second parameter may include at least one of the following: indication information indicating that the target cell meets an execution condition of the CHO command and LBT is successfully performed in the target cell, indication information indicating that the UE fails to perform random access in the target cell, information about a time period from time at which the UE receives the CHO command to time at which the target cell is determined, information about a time period from the time at which the target cell is determined to time at which the UE successfully performs LBT in the target cell, and information about a time period from the time at which the UE successfully performs LBT in the target cell to time at which the UE fails to perform random access in the target cell.

Optionally, the second parameter may further include cell information of the source cell, cell information of the target cell, a C-RNTI allocated by the target cell to the UE, a failure type value (for example, an HOF) of the UE in the target cell, signal quality of the source cell and signal quality of the target cell used when the UE successfully performs LBT in the target cell, and signal quality of the source cell and signal quality of the target cell used when the UE fails to perform random access in the target cell.

Optionally, after the UE fails to hand over from the source cell to the target cell, that the UE selects the cell includes the following several scenarios.

First Optional Scenario:

The CHO command includes information about one or more candidate cells, the cell selected by the UE is a first cell, and the first cell is one of the one or more candidate cells. When failing to perform LBT in the first cell, or successfully performing LBT and failing to perform random access in the first cell, the UE initiates a radio resource control RRC reestablishment procedure. The first information may be a radio link failure report (RLF report).

When the UE fails to perform channel access LBT in the first cell, the first information further includes a third parameter, and the third parameter is related to the CHO failure caused by the LBT failure of the UE in the first cell.

The third parameter may include at least one of the following: indication information indicating that the UE fails to perform LBT in the first cell, information about a time period from time at which the UE starts to perform LBT in the first cell to time at which the UE fails to perform LBT in the first cell, information about a time period from the time at which the UE fails to perform LBT in the first cell to time at which the UE initiates the RRC reestablishment procedure, and information about a time period from the time at which the UE fails to perform LBT in the first cell to time at which the UE sends the first information.

Optionally, the third parameter further includes cell information of the first cell, cell information of an RRC reestablishment cell, a C-RNTI allocated by the first cell to the UE, a failure type value (for example, an HOF) of the UE in the first cell, and signal quality of the source cell, signal quality of the target cell, and signal quality of another candidate cell used when the UE fails to perform LBT in the first cell.

Alternatively, when the UE successfully performs LBT and fails to perform random access in the first cell, the first information further includes a fourth parameter, and the fourth parameter is related to the CHO failure caused by the successful LBT and the random access failure of the UE in the first cell.

The fourth parameter includes at least one of the following: indication information indicating that the UE successfully performs LBT in the first cell, indication information indicating that the UE fails to perform random access in the first cell, information about a time period from time at which the UE starts to perform LBT in the first cell to time at which the UE successfully performs LBT in the first cell, information about a time period from the time at which the UE successfully performs LBT in the first cell to time at which the UE fails to perform random access in the first cell, information about a time period from the time at which the UE fails to perform random access in the first cell to time at which the terminal device initiates the RRC reestablishment procedure, and information about a time period from the time at which the UE fails to perform random access in the first cell to time at which the UE sends the first information.

Optionally, the fourth parameter further includes cell information of the first cell, cell information of an RRC reestablishment cell, a C-RNTI allocated by the first cell to the UE, a failure type value of the UE in the first cell, signal quality of the source cell, signal quality of the target cell, and signal quality of the first cell used when the UE successfully performs LBT in the first cell, and signal quality of the source cell, signal quality of the target cell, signal quality of the first cell, and signal quality of another candidate cell used when the UE fails to perform random access in the first cell.

The RRC reestablishment cell may be the source cell, the target cell, the candidate cell, or another cell. This is not limited herein.

Second Optional Scenario:

The CHO command includes information about one or more candidate cells, the cell selected by the UE is a second cell, and the second cell is one of the one or more candidate cells. When successfully performing LBT and random access in the second cell, the UE hands over to the second cell. The first information may be a successful report.

The first information further includes a fifth parameter, and the fifth parameter is related to a successful CHO caused by the successful LBT and random access of the UE in the second cell.

The fifth parameter includes at least one of the following: indication information indicating that the UE successfully performs LBT in the second cell, indication information indicating that the UE successfully performs random access in the second cell, information about a time period from time at which the UE starts to perform LBT in the second cell to time at which the UE successfully performs LBT in the second cell, information about a time period from the time at which the UE successfully performs LBT in the second cell to time at which the UE successfully performs random access in the second cell, and information about a time period from the time at which the UE successfully performs random access in the second cell to time at which the UE sends the first information.

Optionally, the fifth parameter further includes cell information of the second cell, a C-RNTI allocated by the second cell to the UE, and signal quality of the source cell, signal quality of the target cell, signal quality of the second cell, and signal quality of another candidate cell used when the UE successfully performs LBT in the second cell.

Third Optional Scenario:

The CHO command may include indication information of the candidate cell. When the cell selected by the UE is a third cell, the UE initiates an RRC reestablishment procedure in the third cell. The third cell is a cell other than the candidate cell. The first information further includes a sixth parameter, and the sixth parameter is related to the CHO failure of the UE in the target cell and RRC reestablishment performed in the third cell.

Optionally, the sixth parameter includes at least one of the following: indication information indicating that the UE successfully initiates the RRC reestablishment procedure in the third cell, information about a time period from time at which the UE starts to initiate the RRC reestablishment procedure in the third cell to time at which the UE successfully initiates the RRC reestablishment procedure in the third cell, and information about a time period from the time at which the UE successfully initiates the RRC reestablishment procedure in the third cell to time at which the UE sends the first information.

S504: The network device adjusts the network parameter based on the first information. The network parameter includes at least one of a parameter used by the UE to perform conditional handover between cells (which is also referred to as a handover parameter) and a parameter used for channel access LBT (which is also referred to as an LBT parameter). The following describes, with reference to the foregoing several scenarios, how the network device adjusts the network parameter based on the first information.

In the first optional scenario, the UE fails to perform LBT in the first cell.

The UE may report the first information to a base station of the RRC reestablishment cell. The RRC reestablishment cell may be the source cell, the target cell, the candidate cell, or the another cell. The UE may alternatively report the first information to a base station of the source cell, a base station of the target cell, a base station of the candidate cell, or a base station of the another cell. The base station that receives the first information may send a part or all of the first information to the source base station. Optionally, the source base station may determine, based on the first information, whether the failures of the UE in the target cell and the first cell are caused by a cell signal problem or an LBT problem, and further adjust the handover parameter and the LBT parameter.

For example, because the UE fails to perform LBT in the candidate cell, the source base station considers that the failure in the candidate cell is not caused by inappropriate configuration of the CHO parameter, but is caused by inappropriate configuration of the LBT parameter. Therefore, the source base station can adjust the LBT parameter, for example, adjust a maximum quantity of consecutive LBT failures configured for the candidate cell and control LBT duration.

For another example, if the UE fails to perform LBT in the target cell, the source base station considers that the LBT failure in the target cell is not caused by inappropriate configuration of the CHO parameter, but is caused by inappropriate configuration of the LBT parameter. Therefore, the source base station can adjust the LBT parameter, for example, adjust a maximum quantity of consecutive LBT failures configured for the target cell and control LBT duration. If the UE successfully performs LBT but fails to perform CHO in the target cell, the source base station may determine, based on a parameter in the first information, whether the handover failure of the UE in the target cell is caused by the cell signal problem or LBT. For example, based on parameters such as signal quality of the source cell and signal quality of the candidate cell used when the UE successfully performs LBT in the target cell, signal quality of the source cell and signal quality of the candidate cell used when the UE fails to hand over to the target cell, a time period from time at which LBT is determined to be performed in the target cell to time at which the UE successfully performs LBT in the target cell, and a time period from the time at which the UE successfully performs LBT in the target cell to time at which the UE fails to perform random access in the target cell, whether the handover failure of the UE in the target cell is caused by the cell signal problem or the LBT problem is determined, and adjustment is performed. If the handover failure of the UE in the target cell is caused by the cell signal problem, the source base station adjusts the handover parameter, for example, adjusts a trigger value of a measurement report and CHO execution condition information. If the handover failure of the UE in the target cell is caused by the LBT problem, the source base station adjusts the LBT parameter, for example, adjusts a maximum quantity of consecutive LBT failures configured for the target base station and controls LBT duration.

Alternatively, in the first optional scenario, the UE successfully performs LBT and fails to perform random access in the first cell.

The UE may send the first information to a base station of the RRC reestablishment cell. The RRC reestablishment cell may be the source cell, the target cell, the candidate cell, or the another cell. This is not limited herein. Alternatively, the UE may send the first information to the source cell, the target cell, the candidate cell, or the another cell. The base station that receives the first information may forward a part or all of the received first information to the source base station. Optionally, the source base station determines, based on a parameter in the first information, whether the failures of the UE in the target cell and the candidate cell is caused by a cell signal problem or an LBT problem, and further adjusts the handover parameter or the LBT parameter. For a method of analyzing the handover failure of the UE in the target cell, refer to the foregoing descriptions. Details are not described herein again.

For the candidate cell, because the UE successfully performs LBT but fails to perform random access in the candidate cell, the source base station may determine, based on the parameter in the first information, whether the handover failure of the UE in the candidate cell is caused by the cell signal problem or the LBT problem. For example, based on parameters such as signal quality of the source cell and signal quality of the candidate cell used when the UE successfully performs LBT in the candidate cell, signal quality of the source cell and signal quality of the candidate cell used when the UE fails to hand over to the candidate cell, a time period from time at which the UE starts to perform LBT in the candidate cell to time at which the UE successfully performs LBT in the candidate cell, and a time period from the time at which the UE successfully performs LBT in the candidate cell to time at which the UE fails to perform random access in the candidate cell, whether the handover failure of the UE in the candidate cell is caused by the cell signal problem or the LBT problem is analyzed. Further, the network parameter is adjusted. For example, if the handover failure of the UE in the candidate cell is caused by the cell signal problem, the source base station adjusts the handover parameter, for example, adjusts a trigger value of a measurement report and CHO execution condition information. If the handover failure of the UE in the candidate cell is caused by the LBT problem, the source base station adjusts the LBT parameter, for example, adjust a maximum quantity of consecutive LBT failures configured for the candidate cell and control LBT duration.

Alternatively, in the second optional scenario, the UE successfully performs LBT and random access in the second cell.

The UE may send the first information to a base station of a cell in which the CHO succeeds, or the UE may send the first information to another cell other than the candidate cell. The base station that receives the first information may forward a part or all of the received first information to the source base station. Optionally, the source base station determines, based on a parameter in the first information, whether the failure of the UE in the target cell is caused by a cell signal problem or an LBT problem, and further adjusts the handover parameter or the LBT parameter. For details, refer to the foregoing method for analyzing the handover failure in the target cell. Details are not described herein again. Optionally, for the candidate cell, because the UE successfully hands over to the candidate cell, the source base station may determine, based on the reported first information, whether the candidate cell is a good cell. For example, analysis is performed based on signal quality of the source cell, signal quality of the target cell, or signal quality of another candidate cell used when the UE fails to perform random access in the target cell, signal quality of the source cell, signal quality of the target cell, and signal quality of the another candidate cell used when the UE successfully performs LBT in the candidate cell, and the like.

Alternatively, with reference to the first optional scenario and the second optional scenario, if the source base station fails to perform LBT in the source cell for a plurality of times until, finally, LBT is successfully performed, after receiving the first information, the source base station may adjust the LBT parameter based on the first information and a related status of performing LBT in the source cell recorded by the source base station, for example, adjust a maximum quantity of consecutive LBT failures corresponding to a serving cell and control LBT duration.

Alternatively, with reference to the first optional scenario and the second optional scenario, if the random access failure of the UE is caused by an LBT failure on a base station side. For example, a random access response (RAR) cannot be sent to the UE due to the LBT failure of the base station. In this case, the base station sends related information about the LBT failure (for example, an identifier of the UE, cell information of an LBT failure cell, and an LBT failure probability) to the source base station. After receiving the first information, the source base station determines, based on the first information and the related information about the LBT failure, whether the random access failure of the UE is caused by the CHO parameter or the LBT parameter, to adjust the network parameter. For example, if the source base station receives the related information about the LBT failure sent by the base station of the target cell, after receiving the first information sent by another base station, the source base station may consider that the handover failure of the UE in the target cell is caused by the LBT failure of the source base station, and further adjust the LBT parameter used by the source base station, for example, adjust a maximum quantity of consecutive LBT failures corresponding to a serving cell and control LBT duration. It should be noted that a time sequence of time at which the source base station receives the related information about the LBT failure and time at which the source base station receives the first information is not limited.

In this embodiment of this application, after determining, according to the CHO command, to hand over from the source cell to the target cell, the UE performs LBT. Because the UE fails to perform LBT in the target cell, or the UE fails to hand over to the target cell because the UE successfully performs LBT but fails to perform random access in the target cell, the UE selects the cell. The selected cell belongs to the candidate cell. If failing to perform LBT in the candidate cell, successfully performing LBT and random access in the candidate cell, or successfully performing LBT but failing to perform random access in the candidate cell, the UE records the first information related to the CHO failures in these scenarios, and reports the first information to the network device. The network device may determine the cause of the handover failure in the target cell or the candidate cell based on the first information, and adjust the corresponding network parameter. Therefore, system performance is improved.

Figure 6:
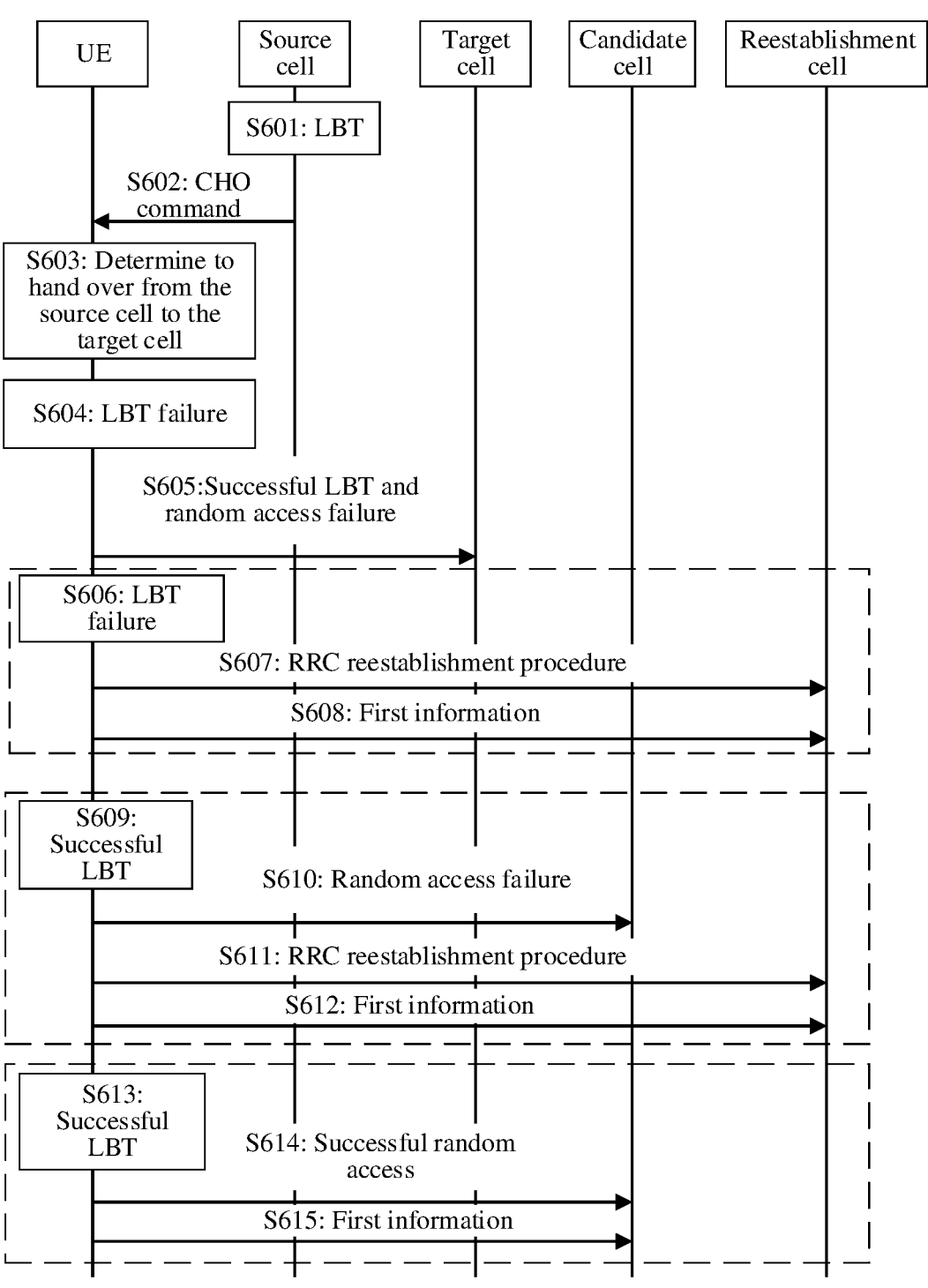
FIG. 6 is a schematic flowchart of another communication method according to an embodiment of this application.

FIG. 6 is a schematic flowchart of a communication method according to an embodiment of this application. This embodiment further describes the embodiment shown in FIG. 5. This embodiment of this application includes at least the following steps.

S601: A source base station performs LBT in a source cell.

If the source base station successfully performs LBT in the source cell, S602 is performed. If the source base station fails to perform LBT in the source cell, LBT is performed again in the source cell until LBT is successfully performed.

S602: The source base station sends a CHO command to UE. The CHO command may include information about a plurality of candidate cells.

S603: The UE determines, according to the CHO command, to hand over from the source cell to a target cell.

S604: The UE performs LBT in the target cell.

If the UE successfully performs LBT in the target cell, S605 is performed. If the UE fails to perform LBT in the target cell, the UE selects a cell, and performs S606 to S608, S609 to S612, or S613 to S615.

S605: The UE performs random access (for example, RACH) in the target cell.

If successfully performing random access in the target cell, the UE hands over from the source cell to the target cell. If failing to perform random access in the target cell, the UE selects a cell, and performs S606 to S608, S609 to S612, or S613 to S615.

That the UE selects a cell includes the following three optional scenarios.

First Scenario:

S606: The UE performs LBT in a candidate cell, and if failing to perform LBT in the candidate cell, the UE performs S607.

S607: The UE initiates an RRC reestablishment procedure to a base station of an RRC reestablishment cell.

S608: The UE sends first information to the base station of the RRC reestablishment cell. For content included in the first information, refer to the first information recorded in the scenario in which the UE fails to perform LBT in the candidate cell in the foregoing embodiments. Details are not described herein.

Second Scenario:

S609: The UE performs LBT in a candidate cell, and if successfully performing LBT in the candidate cell, the UE performs S610.

S610: The UE performs random access in the candidate cell, and if failing to perform random access in the candidate cell, the UE performs S611.

S611: The UE initiates an RRC reestablishment procedure to a base station of an RRC reestablishment cell.

S612: The UE sends first information to the base station of the RRC reestablishment cell. For content included in the first information, refer to the first information recorded in the scenario in which the UE successfully performs LBT and fails to perform random access in the candidate cell in the foregoing embodiments. Details are not described herein.

Third Scenario:

S613: The UE performs LBT in a candidate cell, and if successfully performing LBT in the candidate cell, the UE performs S614.

S614: The UE performs random access in the candidate cell, and if successfully performing random access in the candidate cell, the UE hands over from the source cell to the candidate cell.

S615: The UE sends first information to a base station of the candidate cell. For content included in the first information, refer to the first information recorded in the scenario in which the UE successfully performs LBT and random access in the candidate cell in the embodiment shown in FIG. 5. Details are not described herein.

According to the technical solutions provided in the foregoing embodiment, in a scenario in which the UE fails to perform LBT in the target cell, or fails to hand over to the target cell because the UE successfully performs LBT but fails to perform random access in the target cell, the network device may determine, based on the first information reported by the UE, a cause of the handover failure in the target cell or the candidate cell, and adjust a corresponding network parameter. Therefore, system performance is improved.

Figure 7:
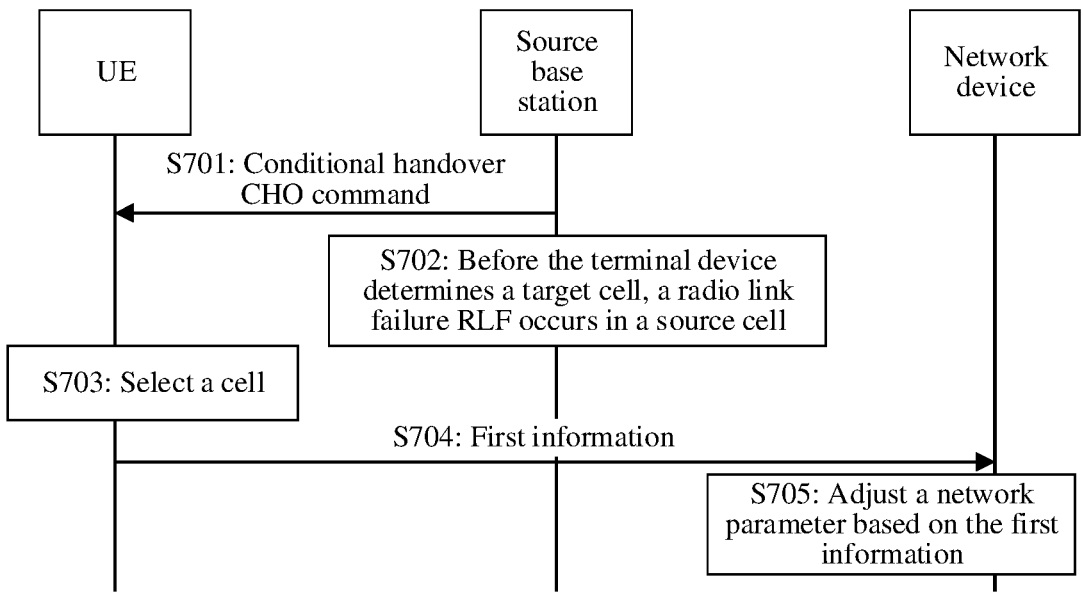
FIG. 7 is a schematic flowchart of another communication method according to an embodiment of this application.

As shown in FIG. 7, for a scenario in which, after UE receives a CHO command, an RLF occurs in a source cell before a target cell is determined, an embodiment of this application provides a communication method. This embodiment of this application includes at least the following steps.

S701: UE receives a conditional handover CHO command from a source base station.

Optionally, before sending the CHO command to the UE, the source base station first performs LBT in a source cell. If LBT is successfully performed, the source base station sends the CHO command to the UE. If LBT fails to be performed, LBT may be performed again in the source cell until LBT is successfully performed. In this case the source base station may record related information about performing LBT in the source cell before sending the CHO command.

S702: Before the UE determines a target cell according to the CHO command, a radio link failure RLF occurs in the source cell.

S703: The UE selects a cell.

S704: The UE sends first information to a network device. The first information includes a first parameter, and the first parameter is related to a CHO failure caused by the RLF that occurs in the source cell.

Optionally, the network device may be the source base station, a base station to which the target cell belongs, a base station to which a candidate cell belongs, or another base station.

The network device may include a first network device and a second network device. For example, the first network device may be the source base station, and the second network device may be a base station other than the source base station. Alternatively, the first network device may be a target base station, and the second network device may be a core network device or the like.

Optionally, the first network device may receive the first information from the second network device. The first information is received by the second network device from the UE.

Optionally, the first network device may generate second information based on the first information, and send the second information to a third network device. The second information indicates the third network device to adjust a network parameter.

In a scenario in which the radio link failure RLF occurs in the source cell before the UE determines the target cell, the first parameter may include at least one of the following: indication information indicating that the RLF occurs in the source cell, and a time period from time at which the UE receives the CHO command to time at which the RLF occurs in the source cell.

Optionally, the first parameter further includes cell information of the source cell, signal quality of the source cell used when the RLF occurs in the source cell, and the like.

Optionally, after the radio link failure RLF occurs in the source cell, that the UE selects a cell may include the following scenarios.

First Optional Scenario:

The CHO command includes information about one or more candidate cells, the cell selected by the UE is a first cell, and the first cell is one of the one or more candidate cells. When failing to perform LBT in the first cell, or successfully performing LBT and failing to perform random access in the first cell, the UE initiates an RRC reestablishment procedure. The first information may be an RLF report.

When the UE fails to perform LBT in the first cell, the first information may further include a second parameter, and the second parameter is related to the CHO failure caused by the LBT failure of the UE in the first cell.

The second parameter may include at least one of the following: indication information indicating that the UE fails to perform LBT in the first cell, information about a time period from time at which the UE starts to perform LBT in the first cell to time at which the UE fails to perform LBT in the first cell, information about a time period from the time at which the UE fails to perform LBT in the first cell to time at which the UE initiates the RRC reestablishment procedure, and information about a time period from the time at which the UE fails to perform LBT in the first cell to time at which the UE sends the first information.

Optionally, the second parameter further includes cell information of the first cell, cell information of an RRC reestablishment cell, a C-RNTI allocated by the first cell to the UE, a failure type value of the UE in the first cell, and signal quality of the source cell, signal quality of the target cell, and signal quality of another candidate cell used when the UE fails to perform LBT in the first cell.

Alternatively, when the UE successfully performs LBT and fails to perform random access in the first cell, the first information further includes a third parameter, and the third parameter is related to the CHO failure caused by the successful LBT and the random access failure of the UE in the first cell.

The third parameter includes at least one of the following: indication information indicating that the UE successfully performs LBT in the first cell, indication information indicating that the UE fails to perform random access in the first cell, information about a time period from time at which the UE starts to perform LBT in the first cell to time at which the UE successfully performs LBT in the first cell, information about a time period from the time at which the UE successfully performs LBT in the first cell to time at which the UE fails to perform random access in the first cell, information about a time period from the time at which the UE fails to perform random access in the first cell to time at which the terminal device initiates the RRC reestablishment procedure, and information about a time period from the time at which the UE fails to perform random access in the first cell to time at which the UE sends the first information.

Optionally, the third parameter further includes cell information of the first cell, cell information of an RRC reestablishment cell, a C-RNTI allocated by the first cell to the UE, a failure type value of the UE in the first cell, signal quality of the source cell, signal quality of the target cell, and signal quality of the first cell used when the UE successfully performs LBT in the first cell, signal quality of the source cell, signal quality of the target cell, signal quality of the first cell, and signal quality of another candidate cell used when the UE fails to perform random access in the first cell, and the like.

Second Optional Scenario:

The CHO command includes information about one or more candidate cells, the cell selected by the UE is a second cell, and the second cell is one of the one or more candidate cells. When successfully performing LBT and random access in the second cell, the UE hands over to the second cell. The first information may be a successful report. The first information may further include a fourth parameter, and the fourth parameter is related to a successful CHO caused by the successful LBT and random access of the UE in the second cell.

The fourth parameter includes at least one of the following: indication information indicating that the UE successfully performs LBT in the second cell, indication information indicating that the UE successfully performs random access in the second cell, information about a time period from time at which the UE starts to perform LBT in the second cell to time at which the UE successfully performs LBT in the second cell, information about a time period from the time at which the UE successfully performs LBT in the second cell to time at which the UE successfully performs random access in the second cell, and information about a time period from the time at which the terminal device successfully performs random access in the second cell to time at which the UE sends the first information.

Optionally, the fourth parameter further includes cell information of the second cell, a C-RNTI allocated by the second cell to the UE, and signal quality of the source cell, signal quality of the target cell, signal quality of the second cell, and signal quality of another candidate cell used when the UE successfully performs LBT in the second cell.

Third Optional Scenario: The CHO command includes information about the candidate cell. When the cell selected by the UE is a third cell, the UE initiates an RRC reestablishment procedure in the third cell. The third cell is a cell other than the candidate cell. The first information further includes a fifth parameter, and the fifth parameter is related to the RLF that is of the UE and that occurs in the source cell and RRC reestablishment performed in the third cell.

Optionally, the fifth parameter includes at least one of the following: indication information indicating that the UE successfully initiates the RRC reestablishment procedure in the third cell, information about a time period from time at which the UE starts to initiate the RRC reestablishment procedure in the third cell to time at which the UE successfully initiates the RRC reestablishment procedure in the third cell, and information about a time period from the time at which the UE successfully initiates the RRC reestablishment procedure in the third cell to time at which the UE sends the first information.

S705: The network device adjusts the network parameter based on the first information. The network parameter includes at least one of a parameter used by the UE to perform conditional handover between cells and a parameter used for channel access LBT. The following describes, with reference to the foregoing several scenarios, how to adjust the network parameter based on the first information.

In the first optional scenario, the UE fails to perform LBT in the first cell. The first information may be the radio link failure report (RLF report).

The UE may send the first information to a base station of the RRC reestablishment cell. The RRC reestablishment cell may be the source cell, the target cell, the candidate cell, or another cell. This is not limited herein. Alternatively, the UE may send the first information to a base station of the source cell, a base station of the target cell, a base station of the candidate cell, or a base station of the another cell. The base station that receives the first information may forward a part or all of the received first information to the source base station. Optionally, after receiving the first information, the source base station considers that the CHO occurs too late. Optionally, the handover failure of the UE in the candidate cell is caused by an inappropriate LBT parameter, and the source base station may adjust the LBT parameter, for example, adjust a maximum quantity of consecutive LBT failures configured by a network and LBT duration.

In the first optional scenario, the UE successfully performs LBT in the first cell and fails to perform random access. The first information may be the radio link failure report (RLF report).

The UE may send the first information to a base station of the RRC reestablishment cell. The RRC reestablishment cell may be the source cell, the target cell, the candidate cell, or another cell. This is not limited herein. Alternatively, the UE may send the first information to a base station of the source cell, a base station of the target cell, a base station of the candidate cell, or a base station of the another cell. The base station that receives the first information may forward a part or all of the received first information to the source base station. Optionally, the source base station may consider the CHO occurs too late. Optionally, the source base station may determine, based on the first information, whether the random access failure of the UE in the candidate cell is caused by a cell signal problem or the LBT problem, and adjust the network parameter. For example, the network parameter is adjusted based on parameters such as signal quality of the source cell and signal quality of the candidate cell used when the UE successfully perform LBT in the candidate cell, signal quality of the source cell and signal quality of the candidate cell used when the UE fails to perform random access in the candidate cell, a time period from time at which the UE starts to perform LBT in the candidate cell to time at which the UE successfully performs LBT in the candidate cell, and a time period from the time at which the UE successfully performs LBT in the candidate cell to time at which the UE fails to perform random access in the candidate cell. If the random access failure in the candidate cell is caused by the cell signal problem, the source base station may adjust the handover parameter, for example, adjust a trigger value of a measurement report and CHO execution condition information. If the random access failure in the candidate cell is caused by the LBT problem, the source base station may adjust the LBT parameter, for example, a maximum quantity of consecutive LBT failures configured by a network, and LBT duration.

In the second optional scenario, the UE successfully performs LBT and random access in the second cell. The first information may be the successful report.

The UE may send the first information to the candidate cell to which the handover succeeds. Alternatively, the UE may send the first information to another cell other than the candidate cell. Optionally, a base station that receives the first information may forward a part or all of the received first information to the source base station. Optionally, after receiving the first information, the source base station considers that the CHO occurs too late.

Alternatively, with reference to the first optional scenario and the second optional scenario, if the source base station fails to perform LBT in the source cell for a plurality of times until, finally, LBT is successfully performed, after receiving the first information, the source base station may adjust the LBT parameter based on the first information and a related status of performing LBT in the source cell recorded by the source base station, for example, adjust a maximum quantity of consecutive LBT failures corresponding to a serving cell and control LBT duration.

Alternatively, with reference to the first optional scenario and the second optional scenario, if the random access failure of the UE is caused by an LBT failure on a base station side. For example, a random access response (RAR) cannot be sent to the UE due to the LBT failure of the base station. In this case, the base station sends related information about the LBT failure (for example, an identifier of the UE, cell information of an LBT failure cell, and an LBT failure probability) to the source base station. After receiving the first information, the source base station determines, based on the first information and the related information about the LBT failure, whether the random access failure of the UE is caused by the CHO parameter or the LBT parameter, to adjust the network parameter. For example, if the source base station receives the related information about the LBT failure sent by the base station of the target cell, after receiving the first information sent by another base station, the source base station may consider that the handover failure of the UE in the target cell is caused by the LBT failure of the source base station, and therefore adjusts the LBT parameter used by the source base station, for example, adjusts a maximum quantity of consecutive LBT failures corresponding to a serving cell and control LBT duration. It should be noted that a time sequence of time at which the source base station receives the related information about the LBT failure and time at which the source base station receives the first information is not limited.

In this embodiment of this application, after the UE receives the CHO command, the RLF occurs in the source cell before the UE determines the target cell, and the UE selects the cell. The selected cell belongs to the candidate cell. If failing to perform LBT in the candidate cell, successfully performing LBT and random access in the candidate cell, or successfully performing LBT but failing to perform random access in the candidate cell, the UE records the first information related to the CHO failures in these scenarios, and reports the first information to the network device. The network device may determine the cause of the handover failure in the target cell or the candidate cell based on the first information, and adjust the corresponding network parameter. Therefore, system performance is improved.

Figure 8:
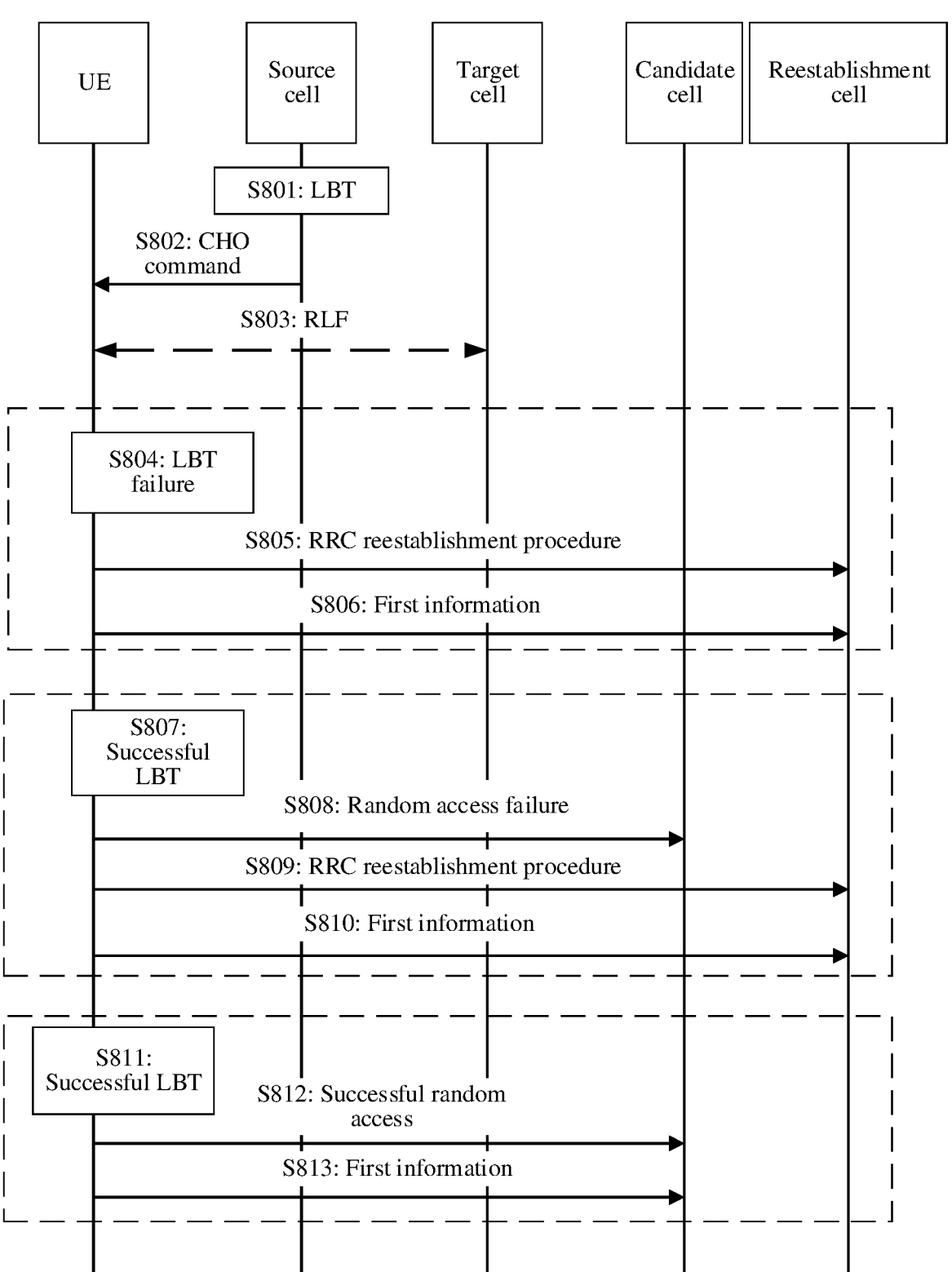
FIG. 8 is a schematic flowchart of another communication method according to an embodiment of this application.

FIG. 8 is a schematic flowchart of a communication method according to an embodiment of this application. This embodiment further describes the embodiment shown in FIG. 7. This embodiment of this application includes at least the following steps.

S801: A source base station performs LBT in a source cell. If the source base station successfully performs LBT in the source cell, S802 is performed. If the source base station fails to perform LBT in the source cell, LBT is performed again in the source cell until LBT is successfully performed.

S802: The source base station sends a CHO command to UE. The CHO command may include information about a plurality of candidate cells.

S803: Before the UE determines a target cell according to the CHO command, a radio link failure RLF occurs in the source cell. That the UE selects a cell includes the following three scenarios.

First Scenario:

S804: The UE performs LBT in a candidate cell, and if failing to perform LBT in the candidate cell, the UE performs S805.

S805: The UE initiates an RRC reestablishment procedure to a base station of an RRC reestablishment cell.

S806: The UE sends first information to the base station of the RRC reestablishment cell. For content included in the first information, refer to the first information recorded in the scenario in which the UE fails to perform LBT in the candidate cell in the foregoing embodiments. Details are not described herein.

Second Scenario:

S807: The UE performs LBT in a candidate cell, and if successfully performing LBT in the candidate cell, the UE performs S808.

S808: The UE performs random access in the candidate cell, and if failing to perform random access in the candidate cell, the UE performs S809.

S809: The UE initiates an RRC reestablishment procedure to a base station of an RRC reestablishment cell.

S810: The UE sends first information to the base station of the RRC reestablishment cell. For content included in the first information, refer to the first information recorded in the scenario in which the UE successfully performs LBT and fails to perform random access in the candidate cell in the foregoing embodiments. Details are not described herein.

Third Scenario:

S811: The UE performs LBT in a candidate cell, and if successfully performing LBT in the candidate cell, the UE performs S812.

S812: The UE performs random access in the candidate cell, and if successfully performing random access in the candidate cell, the UE hands over from the source cell to the candidate cell.

S813: The UE sends first information to a base station of the candidate cell. For content included in the first information, refer to the first information recorded in the scenario in which the UE successfully performs LBT and random access in the candidate cell in the embodiment shown in FIG. 7. Details are not described herein.

Figure 9:
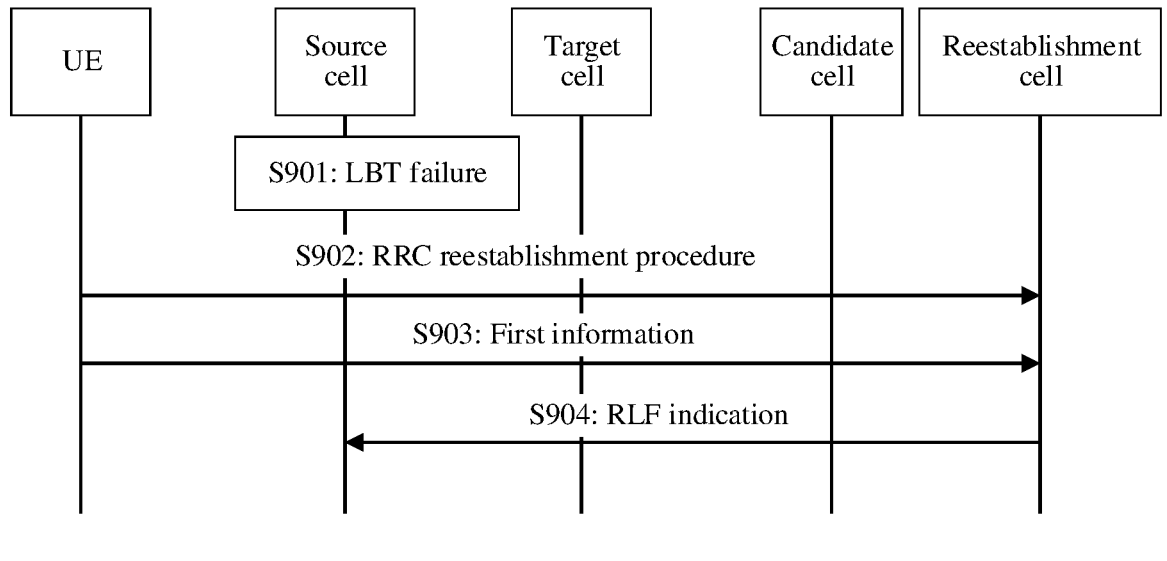
FIG. 9 is a schematic flowchart of another communication method according to an embodiment of this application.

As shown in FIG. 9, for a scenario in which, a source base station cannot send a CHO command to UE because LBT fails to be performed before the source base station sends the CHO command to the UE, an embodiment of this application provides a communication method. This embodiment of this application includes at least the following steps.

S901: A source base station performs channel access LBT in a source cell.

Optionally, before sending the CHO command to the UE, the source base station preferentially performs LBT in the source cell. The source base station cannot send the CHO command to the UE because LBT fails to be performed, and the source base station may record a status of the LBT failure of the source base station.

S902: When the CHO command fails to be sent because the source base station fails to perform channel access LBT in the source cell, the UE cannot perceive the LBT failure of the source base station, but may record an RLF report. In addition, after a radio link failure RLF occurs in the source cell, the UE initiates a radio resource control RRC reestablishment procedure.

S903: The UE may send first information to a base station of an RRC reestablishment cell. The first information is related to a CHO failure caused by the LBT failure of the source base station in the source cell. The first information may be the RLF report.

Alternatively, the UE may send the first information to the source cell, a candidate cell, or another cell.

Optionally, the first information includes at least one of the following: cell information of the source cell, indication information indicating that the RLF occurs in the source cell, signal quality used when the RLF occurs in the source cell, cell information of the RRC reestablishment cell, a failure type value of the UE in the source cell, information about a time period from time at which the RLF occurs in the source cell to time at which the UE initiates the RRC reestablishment procedure, and information about a time period from time at which the RLF occurs in the source cell to time at which the UE sends a first report.

S904: The base station of the RRC reestablishment cell sends an RLF indication to the source base station. The RLF indication may include a part or all of the first information.

Optionally, after receiving the first information, the source base station may determine, based on the status of the LBT failure recorded by the source base station and the first information, that the CHO failure is caused by the LBT failure of the source base station. Therefore, the source base station determines that the connection failure is not caused by a too late handover, and may not adjust a CHO parameter, but adjust an LBT parameter, for example, adjust a maximum quantity of consecutive LBT failures configured for the candidate cell and control LBT duration.

In this embodiment of this application, the source base station cannot send the CHO command to the UE because the source base station fails to perform LBT before the source base station sends the CHO command to the UE, and the network device determines the cause of the connection failure and adjusts the network parameter. Therefore, system reliability is improved.

The foregoing describes in detail the methods in embodiments of this application, and the following describes apparatuses provided in embodiments of this application.

Figure 10:
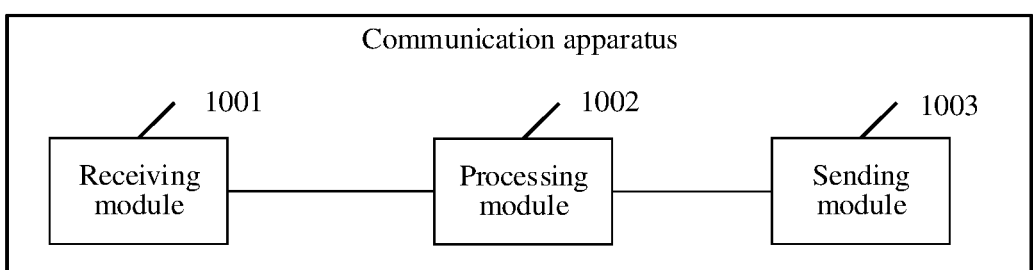
FIG. 10 is a schematic diagram of a structure of a communication apparatus according to an embodiment of this application.

FIG. 10 is a schematic diagram of a structure of a communication apparatus according to an embodiment of this application. The communication apparatus may be a terminal device, or a chip or a processing system in the terminal device. The apparatus may be configured to implement any method and function of the terminal device in any one of the foregoing embodiments. The apparatus may include a receiving module 1001, a processing module 1002, and a sending module 1003. Optionally, the receiving module 1001 and the sending module 1003 correspond to a radio frequency circuit and a baseband circuit that are included in the terminal device. The modules are described in detail as follows.

In an Implementation:

The receiving module 1001 is configured to receive a conditional handover CHO command from a source base station, and determine, according to the CHO command, to hand over from a source cell to a target cell.

The processing module 1002 is configured to: when the terminal device fails to perform channel access LBT in the target cell, or successfully performs LBT and fails to perform random access in the target cell, select a cell.

The sending module 1003 is configured to send first information to a network device. The first information includes a first parameter, and the first parameter is related to a CHO failure caused by the LBT failure in the target cell; or the first information includes a second parameter, and the second parameter is related to a CHO failure caused by the successful LBT and the random access failure in the target cell.

Optionally, the first parameter includes at least one of the following: indication information indicating that the target cell meets an execution condition of the CHO command and LBT fails to be performed in the target cell, information about a time period from time at which the terminal device receives the CHO command to time at which the target cell is determined, and information about a time period from the time at which the target cell is determined to time at which the terminal device fails to perform LBT in the target cell.

Optionally, the second parameter includes at least one of the following: indication information indicating that the target cell meets an execution condition of the CHO command and LBT is successfully performed in the target cell, indication information indicating that the terminal device fails to perform random access in the target cell, information about a time period from time at which the terminal device receives the CHO command to time at which the target cell is determined, information about a time period from the time at which the target cell is determined to time at which the terminal device successfully performs LBT in the target cell, and information about a time period from the time at which the terminal device successfully performs LBT in the target cell to time at which the terminal device fails to perform random access in the target cell.

Optionally, the CHO command includes information about one or more candidate cells, the cell selected by the terminal device is a first cell, and the first cell is one of the one or more candidate cells.

The processing module 1002 is further configured to: when LBT fails to be performed in the first cell, or LBT is successfully performed and random access fails to be performed in the first cell, initiate a radio resource control RRC reestablishment procedure.

When the terminal device fails to perform channel access LBT in the first cell, the first information further includes a third parameter, and the third parameter is related to the CHO failure caused by the LBT failure of the terminal device in the first cell.

Alternatively, when the terminal device successfully performs LBT and fails to perform random access in the first cell, the first information further includes a fourth parameter, and the fourth parameter is related to the CHO failure caused by the successful LBT and the random access failure of the terminal device in the first cell.

Optionally, the third parameter includes at least one of the following: indication information indicating that the terminal device fails to perform LBT in the first cell, information about a time period from time at which the terminal device starts to perform LBT in the first cell to time at which the terminal device fails to perform LBT in the first cell, information about a time period from the time at which the terminal device fails to perform LBT in the first cell to time at which the terminal device initiates the RRC reestablishment procedure, and information about a time period from the time at which the terminal device fails to perform LBT in the first cell to time at which the terminal device sends the first information.

Optionally, the fourth parameter includes at least one of the following: indication information indicating that the terminal device successfully performs LBT in the first cell, indication information indicating that the terminal device fails to perform random access in the first cell, information about a time period from time at which the terminal device starts to perform LBT in the first cell to time at which the terminal device successfully performs LBT in the first cell, information about a time period from the time at which the terminal device successfully performs LBT in the first cell to time at which the terminal device fails to perform random access in the first cell, information about a time period from the time at which the terminal device fails to perform random access in the first cell to time at which the terminal device initiates the RRC reestablishment procedure, and information about a time period from the time at which the terminal device fails to perform random access in the first cell to time at which the terminal device sends the first information.

Optionally, the CHO command includes information about one or more candidate cells, the cell selected by the terminal device is a second cell, and the second cell is one of the one or more candidate cells.

The processing module 1002 is further configured to: when the terminal device successfully performs LBT and random access in the second cell, hand over to the second cell.

The first information further includes a fifth parameter, and the fifth parameter is related to a successful CHO caused by the successful LBT and random access of the terminal device in the second cell.

Optionally, the fifth parameter includes at least one of the following:

indication information indicating that the terminal device successfully performs LBT in the second cell, indication information indicating that the terminal device successfully performs random access in the second cell, information about a time period from time at which the terminal device starts to perform LBT in the second cell to time at which the terminal device successfully performs LBT in the second cell, information about a time period from the time at which the terminal device successfully performs LBT in the second cell to time at which the terminal device successfully performs random access in the second cell, and information about a time period from the time at which the terminal device successfully performs random access in the second cell to time at which the terminal device sends the first information.

Optionally, the CHO command includes indication information of a candidate cell. The processing module 1002 is further configured to: when the cell selected by the terminal device is a third cell, initiate an RRC reestablishment procedure in the third cell. The third cell is a cell other than the candidate cell.

Optionally, the network device is the source base station, a base station to which the target cell belongs, or a base station to which the candidate cell belongs.

In another implementation:

The receiving module 1001 is configured to receive a conditional handover CHO command from a source base station.

The processing module 1002 is configured to select a cell when a radio link failure RLF occurs in a source cell before the terminal device determines a target cell, where the target cell is determined according to the CHO command.

The sending module 1003 is configured to send first information to a network device. The first information includes a first parameter, and the first parameter is related to a CHO failure caused by the RLF that occurs in the source cell.

Optionally, the first parameter includes at least one of the following: indication information indicating that the RLF occurs in the source cell, and a time period from time at which the terminal device receives the CHO command to time at which the RLF occurs in the source cell.

Optionally, the CHO command includes information about one or more candidate cells, the cell selected by the terminal device is a first cell, and the first cell is one of the one or more candidate cells.

The processing module 1002 is configured to: when the terminal device fails to perform LBT in the first cell, or successfully performs LBT and fails to perform random access in the first cell, initiate an RRC reestablishment procedure.

When the terminal device fails to perform LBT in the first cell, the first information further includes a second parameter, and the second parameter is related to the CHO failure caused by the LBT failure of the terminal device in the first cell.

Alternatively, when the terminal device successfully performs LBT and fails to perform random access in the first cell, the first information further includes a third parameter, and the third parameter is related to the CHO failure caused by the successful LBT and the random access failure of the terminal device in the first cell.

Optionally, the second parameter includes at least one of the following: indication information indicating that the terminal device fails to perform LBT in the first cell, information about a time period from time at which the terminal device starts to perform LBT in the first cell to time at which the terminal device fails to perform LBT in the first cell, information about a time period from the time at which the terminal device fails to perform LBT in the first cell to time at which the terminal device initiates the RRC reestablishment procedure, and information about a time period from the time at which the terminal device fails to perform LBT in the first cell to time at which the terminal device sends the first information.

Optionally, the third parameter includes at least one of the following: indication information indicating that the terminal device successfully performs LBT in the first cell, indication information indicating that the terminal device fails to perform random access in the first cell, information about a time period from time at which the terminal device starts to perform LBT in the first cell to time at which the terminal device successfully performs LBT in the first cell, information about a time period from the time at which the terminal device successfully performs LBT in the first cell to time at which the terminal device fails to perform random access in the first cell, information about a time period from the time at which the terminal device fails to perform random access in the first cell to time at which the terminal device initiates the RRC reestablishment procedure, and information about a time period from the time at which the terminal device fails to perform random access in the first cell to time at which the terminal device sends the first information.

Optionally, the CHO command includes information about one or more candidate cells, the cell selected by the terminal device is a second cell, and the second cell is one of the one or more candidate cells. The processing module 1002 is further configured to: when LBT and random access are successfully performed in the second cell, hand over to the second cell. The first information further includes a fourth parameter, and the fourth parameter is related to a successful CHO caused by the successful LBT and random access of the terminal device in the second cell.

Optionally, the fourth parameter includes at least one of the following: indication information indicating that the terminal device successfully performs LBT in the second cell, indication information indicating that the terminal device successfully performs random access in the second cell, information about a time period from time at which the terminal device starts to perform LBT in the second cell to time at which the terminal device successfully performs LBT in the second cell, information about a time period from the time at which the terminal device successfully performs LBT in the second cell to time at which the terminal device successfully performs random access in the second cell, and information about a time period from the time at which the terminal device successfully performs random access in the second cell to time at which the terminal device sends the first information.

Optionally, the CHO command includes information about a candidate cell. The processing module 1002 is further configured to: when the cell selected by the terminal device is a third cell, initiate an RRC reestablishment procedure in the third cell. The third cell is a cell other than the candidate cell.

Optionally, the network device is the source base station, a base station to which the target cell belongs, or a base station to which the candidate cell belongs.

It should be noted that, for implementation of the modules, refer to the corresponding descriptions of the method embodiments shown in FIG. 5 to FIG. 9, to perform the methods and the functions performed by the terminal device in the foregoing embodiments.

Figure 11:
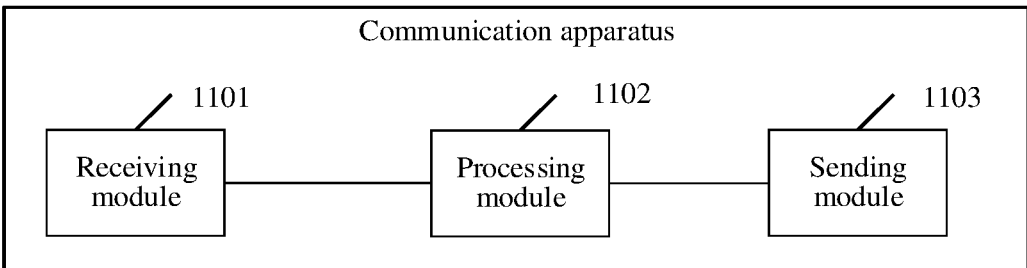
FIG. 11 is a schematic diagram of a structure of another communication apparatus according to an embodiment of this application.

FIG. 11 is a schematic diagram of a structure of another communication apparatus according to an embodiment of this application. The communication apparatus may be a network device, or a chip or a processing system in the network device. The apparatus may be configured to implement any method and function of the network device in any one of the foregoing embodiments. The apparatus may include a receiving module 1101, a processing module 1102, and a sending module 1103. Optionally, the receiving module 1101 and the sending module 1103 correspond to a radio frequency circuit and a baseband circuit that are included in the network device. The modules are described in detail as follows.

In an Implementation:

The receiving module 1101 is configured to receive first information. The first information includes a first parameter, and the first parameter is related to a CHO failure caused by an LBT failure in a target cell; or the first information includes a second parameter, and the second parameter is related to a CHO failure caused by successful LBT and arandom access failure in a target cell.

The processing module 1102 is configured to adjust a network parameter based on the first information. The network parameter includes at least one of a parameter used by a terminal device to perform conditional handover between cells and a parameter used for channel access LBT.

Optionally, the receiving module 1101 is further configured to receive the first information from a second network device. The first information is received by the second network device from the terminal device.

Optionally, the processing module 1102 is further configured to generate second information based on the first information.

The sending module 1103 is configured to send the second information to a third network device. The second information indicates the third network device to adjust the network parameter.

Optionally, the communication apparatus is a source base station, or the communication apparatus is a base station other than the source base station, or the communication apparatus is a core network device.

In Another Implementation:

The receiving module 1101 is configured to receive first information. The first information includes a first parameter, and the first parameter is related to a CHO failure caused by an RLF that occurs in a source cell.

The processing module 1102 is configured to adjust a network parameter based on the first information. The network parameter includes at least one of a parameter used by a terminal device to perform conditional handover between cells and a parameter used for channel access LBT.

Optionally, the receiving module 1101 is further configured to receive the first information from a second network device. The first information is received by the second network device from the terminal device.

Optionally, the processing module 1102 is further configured to generate second information based on the first information.

The sending module 1103 is configured to send the second information to a third network device. The second information indicates the third network device to adjust the network parameter.

Optionally, the communication apparatus is a source base station, or the communication apparatus is a base station other than the source base station, or the communication apparatus is a core network device.

It should be noted that, for implementation of the modules, refer to the corresponding descriptions of the method embodiments shown in FIG. 5 to FIG. 9, to perform the methods and the functions performed by the network device in the foregoing embodiments.

Figure 12:
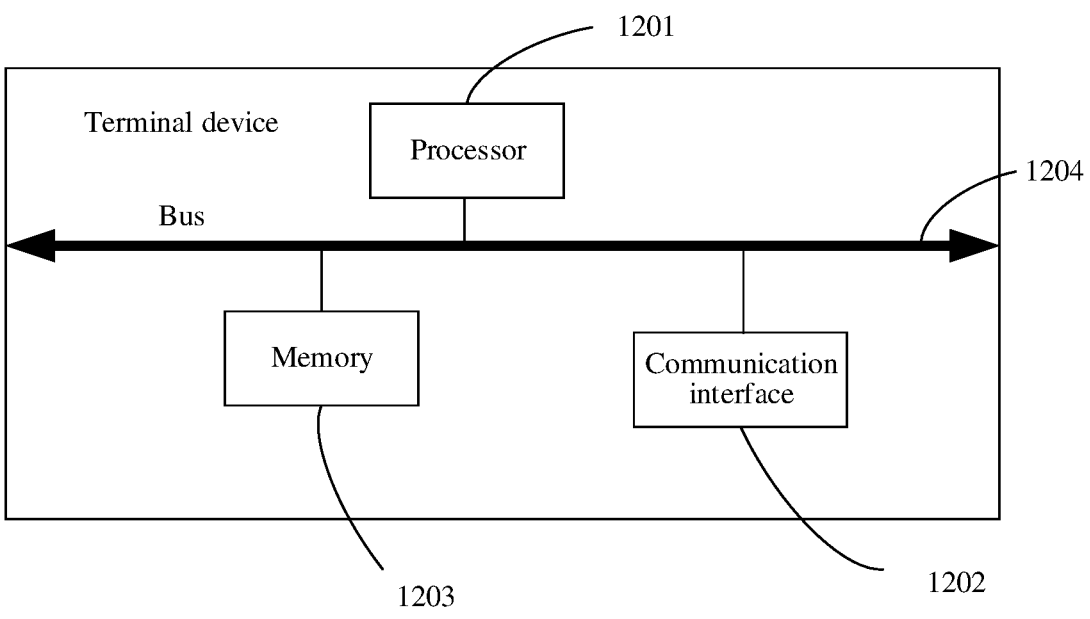
FIG. 12 is a schematic diagram of a structure of a terminal device according to an embodiment of this application.

FIG. 12 is a schematic diagram of a structure of a terminal device according to an embodiment of this application. The terminal device may include at least one processor 1201, at least one communication interface 1202, at least one memory 1203, and at least one communication bus 1204.

The processor 1201 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication bus 1204 may be a peripheral component interconnect PCI bus, an extended industry standard architecture EISA bus, or the like. The bus may be classified into an address bus, a data bus, a control bus, and the like. For ease of representation, only one thick line is for representing the bus in FIG. 12, but this does not mean that there is only one bus or only one type of bus. The communication bus 1204 is configured to implement connection and communication between these components. The communication interface 1202 in the device in this embodiment of this application is configured to perform signaling or data communication with another node device. The memory 1203 may include a volatile memory, for example, a nonvolatile dynamic random access memory (NVRAM), a phase-change random access memory (phase-change RAM, PRAM), or a magnetoresistive random access memory (magnetoresistive RAM, MRAM). The memory may further include a nonvolatile memory, for example, at least one magnetic disk storage device, an electrically erasable programmable read-only memory (EEPROM), a flash storage device such as a NOR flash memory or an NAND flash memory, or a semiconductor device such as a solid-state drive (SSD). Optionally, the memory 1203 may be at least one storage apparatus far away from the processor 1201. Optionally, the memory 1203 may further store a group of program code. Optionally, the processor 1201 may further execute a program stored in the memory 1203. The processor may cooperate with the memory and the communication interface to perform any method and function of the terminal device in the foregoing embodiments of this application.

Figure 13:
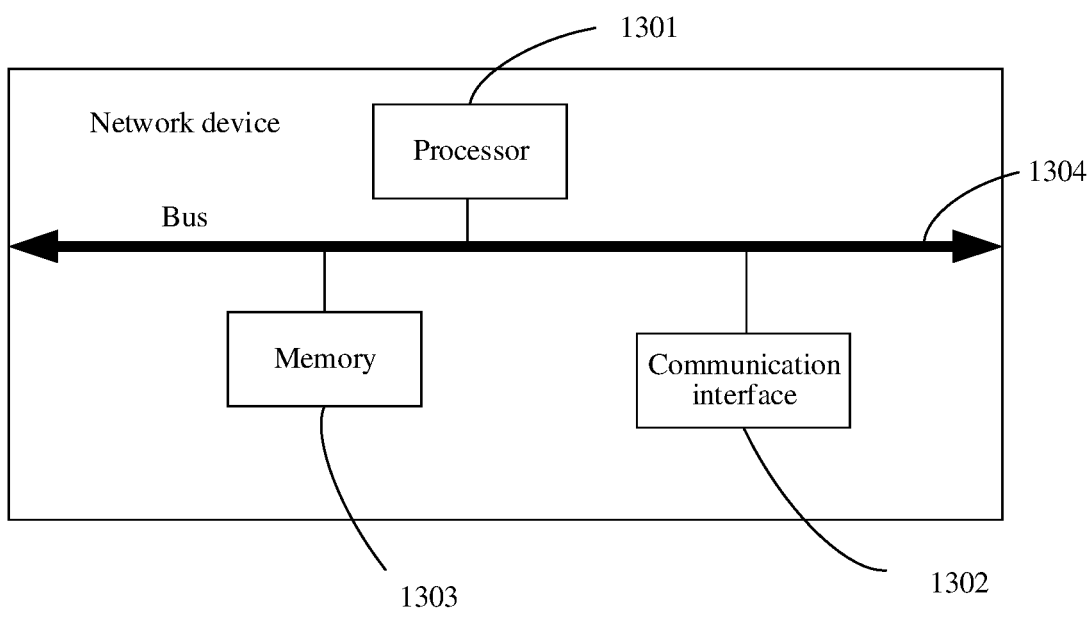
FIG. 13 is a schematic diagram of a structure of a network device according to an embodiment of this application.

FIG. 13 is a schematic diagram of a structure of a network device according to an embodiment of this application. The network device may include at least one processor 1301, at least one communication interface 1302, at least one memory 1303, and at least one communication bus 1304.

The processor 1301 may be processors of various types that are mentioned above. The communication bus 1304 may be a peripheral component interconnect PCI bus, an extended industry standard architecture EISA bus, or the like. The bus may be classified into an address bus, a data bus, a control bus, and the like. For ease of representation, only one thick line is for representing the bus in FIG. 13, but this does not mean that there is only one bus or only one type of bus. The communication bus 1304 is configured to implement connection and communication between these components. The communication interface 1302 in the device in this embodiment of this application is configured to perform signaling or data communication with another node device. The memory 1303 may be memories of various types mentioned above. Optionally, the memory 1303 may be at least one storage apparatus far away from the processor 1301. The memory 1303 stores a group of program code, and the processor 1301 executes a program in the memory 1303. The processor may cooperate with the memory and the communication interface to perform any method and function of the network device in the foregoing embodiments of this application.

An embodiment of this application further provides a chip system. The chip system includes a processor, configured to support a terminal device or a network device in implementing the functions in any one of the foregoing embodiments, for example, generating or processing the first information in the foregoing methods. In a possible design, the chip system may further include a memory, and the memory is configured to store program instructions and data that are for the terminal device or a network device. The chip system may include a chip, or may include a chip and another discrete component.

An embodiment of this application further provides a processor, configured to be coupled to a memory, and configured to perform any method and function of the terminal device or the network device in any one of the foregoing embodiments.

An embodiment of this application further provides a computer program product including instructions. When the instructions are run on a computer, the computer is enabled to perform any method and function of the terminal device or the network device in any one of the foregoing embodiments.

An embodiment of this application further provides an apparatus, configured to perform any method and function of the terminal device or the network device in any one of the foregoing embodiments.

An embodiment of this application further provides a wireless communication system. The system includes at least one terminal device and at least one network device in any one of the foregoing embodiments.

It may be clearly understood by a person skilled in the art that, for ease and brevity of description, for a detailed working process of the foregoing communication apparatus and the units or modules in the apparatus, refer to the corresponding processes in the foregoing method embodiments. Details are not described herein again.

A part or some of the foregoing embodiments may be implemented by software, hardware, firmware, or any combination thereof. When software is used to implement the foregoing embodiments, all or a part of the foregoing embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that the term "and/or" in this specification describes only an association relationship between associated objects and represents that three relationships may exist. For example, A and/or B may represent the following three cases: Only A exists, both A and B exist, and only B exists.

It should be understood that, in various embodiments, "B corresponding to A" indicates that B is associated with A, and B can be determined based on A. However, it should be further understood that determining B based on A does not mean that B is determined based only on A. B may alternatively be determined based on A and/or other information.

"A plurality of" in embodiments of this application means two or more than two.

Descriptions such as "first" and "second" in embodiments of this application are merely used for indicating and distinguishing between described objects, do not show a sequence, do not indicate a specific limitation on a quantity of the described objects in embodiments of this application, and cannot constitute any limitation on embodiments of this application.

It may be understood that in embodiments of this application, the terminal device and/or the network device may perform a part or all of the steps in embodiments of this application. These steps or operations are merely examples. In embodiments of this application, other operations or variations of various operations may be further performed. In addition, the steps may be performed in different sequences presented in embodiments of this application, and not all the operations in embodiments of this application may need to be performed.

The objectives, technical solutions, and beneficial effects of this application are further described in detail in the foregoing specific implementations. Any modification, equivalent replacement, or improvement made without departing from the principle of this application shall fall within the protection scope of this application.

What is claimed is:

1. A communication method for a terminal device, wherein the communication method comprises:

receiving a conditional handover (CHO) command from a source network device, wherein the CHO command comprises information about one or more candidate cells;

selecting, by the terminal device, a cell in response to a radio link failure (RLF) in a source cell before the terminal device determines a target cell, wherein the target cell is determined according to the CHO command; and sending, first information to a network device, wherein the first information comprises a first parameter, and the first parameter is related to a CHO failure caused by the RLF in the source cell, wherein the first information causes the source network device to:

adjust a network parameter based on the first information, wherein the network parameter comprises at least one of a parameter used by the terminal device to perform CHO between cells and a parameter used for listen before talk (LBT);

determine whether the CHO failure is caused by a cell signal problem or an LBT problem in the candidate cell, wherein the cell signal problem includes a signal quality used during the CHO failure, and the LBT problem includes a time period associated with a time at which the terminal device fails to perform random access in the candidate cell;

in response to determining that the CHO failure is caused by the cell signal problem, adjust a trigger value of a measurement report and CHO execution condition information; and in response to determining that the CHO failure is caused by the LBT problem, adjust a maximum quantity of consecutive LBT failures and LBT duration.

2. The communication method according to claim 1, wherein the first parameter comprises at least one of indication information indicating that the RLF occurs in the source cell, or information about a time period from time at which the terminal device receives the CHO command to time at which the RLF occurs in the source cell.

3. The communication method according to claim 1, wherein the cell selected by the terminal device is a first cell, the first cell is one of the one or more candidate cells, and the communication method further comprises:

in response to the terminal device failing to perform listen before talk (LBT) in the first cell, or successfully performing LBT and failing to perform random access in the first cell, initiating a radio resource control (RRC) reestablishment procedure, wherein in response to the terminal device failing to perform LBT in the first cell, the first information is caused to further comprise a second parameter, and the second parameter is related to the CHO failure caused by the LBT failure of the terminal device in the first cell; or in response to the terminal device successfully performing LBT and failing to perform random access in the first cell, the first information is caused to further comprise a third parameter, and the third parameter is related to the CHO failure caused by the successful LBT and the random access failure of the terminal device in the first cell.

4. The communication method according to claim 3, wherein the second parameter comprises at least one of:

indication information indicating that the terminal device fails to perform LBT in the first cell, information about a time period from time at which the terminal device starts to perform LBT in the first cell to time at which the terminal device fails to perform LBT in the first cell, information about a time period from the time at which the terminal device fails to perform LBT in the first cell to time at which the terminal device initiates the RRC reestablishment procedure, or information about a time period from the time at which the terminal device fails to perform LBT in the first cell to time at which the terminal device sends the first information.

5. The communication method according to claim 3, wherein the third parameter comprises at least one of:

indication information indicating that the terminal device successfully performs LBT in the first cell, indication information indicating that the terminal device fails to perform random access in the first cell, information about a time period from time at which the terminal device starts to perform LBT in the first cell to time at which the terminal device successfully performs LBT in the first cell, information about a time period from the time at which the terminal device successfully performs LBT in the first cell to time at which the terminal device fails to perform random access in the first cell, information about a time period from the time at which the terminal device fails to perform random access in the first cell to time at which the terminal device initiates the RRC reestablishment procedure, or information about a time period from the time at which the terminal device fails to perform random access in the first cell to time at which the terminal device sends the first information.

6. The communication method according to claim 1, wherein the cell selected by the terminal device is a second cell, the second cell is one of the one or more candidate cells, and the communication method further comprises:

in response to successfully performing listen before talk (LBT) and random access in the second cell, handing over, to the second cell, wherein the first information further comprises a fourth parameter, and the fourth parameter is related to a successful CHO caused by the successfully performed LBT and random access of the terminal device in the second cell.

7. The communication method according to claim 6, wherein the fourth parameter comprises at least one of:

indication information indicating that the terminal device successfully performs LBT in the second cell, indication information indicating that the terminal device successfully performs random access in the second cell, information about a time period from time at which the terminal device starts to perform LBT in the second cell to time at which the terminal device successfully performs LBT in the second cell, information about a time period from the time at which the terminal device successfully performs LBT in the second cell to time at which the terminal device successfully performs random access in the second cell, or information about a time period from the time at which the terminal device successfully performs random access in the second cell to time at which the terminal device sends the first information.

8. The communication method according to claim 1, wherein the communication method further comprises:

in response to the cell selected by the terminal device being a third cell, initiating a radio resource control (RRC) reestablishment procedure in the third cell, wherein the third cell is a cell other than the candidate cell.

9. A communication apparatus, comprising:

a processor; and a memory having instructions stored thereon that, when executed by the processor, cause the communication apparatus to:

receive a conditional handover (CHO) command from a source network device, wherein the CHO command comprises information about one or more candidate cells;

cause a terminal device to select a cell in response to a radio link failure (RLF) in a source cell before the terminal device determines a target cell, wherein the target cell is determined according to the CHO command; and send, first information to a network device, wherein the first information comprises a first parameter, and the first parameter is related to a CHO failure caused by the RLF in the source cell, wherein the first information causes the source network device to:

adjust a network parameter based on the first information, wherein the network parameter comprises at least one of a parameter used by the terminal device to perform CHO between cells and a parameter used for listen before talk (LBT);

determine whether the CHO failure is caused by a cell signal problem or an LBT problem in the candidate cell, wherein the cell signal problem includes a signal quality used during the CHO failure, and the LBT problem includes a time period associated with a time at which the terminal device fails to perform random access in the candidate cell;

in response to determining that the CHO failure is caused by the cell signal problem, adjust a trigger value of a measurement report and CHO execution condition information; and in response to determining that the CHO failure is caused by the LBT problem, adjust a maximum quantity of consecutive LBT failures and LBT duration.

10. The communication apparatus according to claim 9, wherein the first parameter comprises at least one of indication information indicating that the RLF occurs in the source cell, or information about a time period from time at which the terminal device receives the CHO command to time at which the RLF occurs in the source cell.

11. The communication apparatus according to claim 9, wherein the cell selected by the terminal device is a first cell, the first cell is one of the one or more candidate cells, and the communication apparatus is further caused to:

in response to the terminal device failing to perform listen before talk (LBT) in the first cell, or successfully performing LBT and failing to perform random access in the first cell, initiate a radio resource control (RRC) reestablishment procedure, wherein in response to the terminal device failing to perform LBT in the first cell, the first information is caused to further comprise a second parameter, and the second parameter is related to the CHO failure caused by the LBT failure of the terminal device in the first cell; or in response to the terminal device successfully performing LBT and failing to perform random access in the first cell, the first information is caused to further comprise a third parameter, and the third parameter is related to the CHO failure caused by the successful LBT and the random access failure of the terminal device in the first cell.

12. The communication apparatus according to claim 11, wherein the second parameter comprises at least one of:

indication information indicating that the terminal device fails to perform LBT in the first cell, information about a time period from time at which the terminal device starts to perform LBT in the first cell to time at which the terminal device fails to perform LBT in the first cell, information about a time period from the time at which the terminal device fails to perform LBT in the first cell to time at which the terminal device initiates the RRC reestablishment procedure, or information about a time period from the time at which the terminal device fails to perform LBT in the first cell to time at which the terminal device sends the first information.

13. The communication apparatus according to claim 11, wherein the third parameter comprises at least one of:

indication information indicating that the terminal device successfully performs LBT in the first cell, indication information indicating that the terminal device fails to perform random access in the first cell, information about a time period from time at which the terminal device starts to perform LBT in the first cell to time at which the terminal device successfully performs LBT in the first cell, information about a time period from the time at which the terminal device successfully performs LBT in the first cell to time at which the terminal device fails to perform random access in the first cell, information about a time period from the time at which the terminal device fails to perform random access in the first cell to time at which the terminal device initiates the RRC reestablishment procedure, or information about a time period from the time at which the terminal device fails to perform random access in the first cell to time at which the terminal device sends the first information.

14. The communication apparatus according to claim 9, wherein the cell selected by the terminal device is a second cell, the second cell is one of the one or more candidate cells, and the communication apparatus is further caused to:

in response to successfully performing listen before talk (LBT) and random access in the second cell, hand over, to the second cell, wherein the first information further comprises a fourth parameter, and the fourth parameter is related to a successful CHO caused by the successfully performed LBT and random access of the terminal device in the second cell.

15. The communication apparatus according to claim 14, wherein the fourth parameter comprises at least one of:

indication information indicating that the terminal device successfully performs LBT in the second cell, indication information indicating that the terminal device successfully performs random access in the second cell, information about a time period from time at which the terminal device starts to perform LBT in the second cell to time at which the terminal device successfully performs LBT in the second cell, information about a time period from the time at which the terminal device successfully performs LBT in the second cell to time at which the terminal device successfully performs random access in the second cell, or information about a time period from the time at which the terminal device successfully performs random access in the second cell to time at which the terminal device sends the first information.

16. The communication apparatus according to claim 9, wherein the communication apparatus is further caused to:

in response to the cell selected by the terminal device being a third cell, initiate a radio resource control (RRC) reestablishment procedure in the third cell, wherein the third cell is a cell other than the candidate cell.

17. A communication apparatus, comprising:

a processor; and a memory having instructions stored thereon that, when executed by the processor, cause the communication apparatus to:

send a conditional handover (CHO) command to a terminal device that includes information about a candidate cell;

receive first information, wherein the first information comprises a first parameter, and the first parameter is related to a CHO failure caused by a radio link failure (RLF) in a source cell;

adjust a network parameter based on the first information, wherein the network parameter comprises at least one of a parameter used by the terminal device to perform CHO between cells and a parameter used for listen before talk (LBT);

determine whether the CHO failure is caused by a cell signal problem or an LBT problem in the candidate cell, wherein the cell signal problem includes a signal quality used during the CHO failure, and the LBT problem includes a time period associated with a time at which the terminal device fails to perform random access in the candidate cell;

in response to determining that the CHO failure is caused by the cell signal problem, adjust a trigger value of a measurement report and CHO execution condition information; and in response to determining that the CHO failure is caused by the LBT problem, adjust a maximum quantity of consecutive LBT failures and LBT duration.

18. The communication apparatus according to claim 17, wherein the first information is received from the terminal device by way of a network device that forwards the first information from the terminal device to the communication apparatus.

19. The communication apparatus according to claim 17, wherein the communication apparatus is further caused to:

generate second information based on the first information; and send the second information to a network device, wherein the second information instructs the network device to adjust the network parameter.

20. The communication apparatus according to claim 17, wherein the communication apparatus is a source network device or a core network device.

* * * * *